(12) United States Patent
Goto

(10) Patent No.: US 8,851,215 B2
(45) Date of Patent: Oct. 7, 2014

(54) ELECTRIC WHEELED APPARATUS

(75) Inventor: Masahiko Goto, Anjo (JP)

(73) Assignee: Makita Corporation, Anjo (JP)

( * ) Notice: Subject to any disclaimer, the term of this patent is extended or adjusted under 35 U.S.C. 154(b) by 138 days.

(21) Appl. No.: 12/868,092

(22) Filed: Aug. 25, 2010

(65) Prior Publication Data

US 2011/0056177 A1 Mar. 10, 2011

(30) Foreign Application Priority Data

Sep. 10, 2009 (JP) ................................ 2009-209175
Nov. 24, 2009 (JP) ................................ 2009-265917

(51) Int. Cl.
| | | |
|---|---|---|
| *A01D 69/02* | (2006.01) | |
| *B60K 1/00* | (2006.01) | |
| *B62D 51/04* | (2006.01) | |
| *B62M 6/40* | (2010.01) | |
| *B60L 11/18* | (2006.01) | |
| *B62M 6/90* | (2010.01) | |
| *B62M 6/55* | (2010.01) | |

(52) U.S. Cl.
CPC .............. *B62M 6/55* (2013.01); *B60L 2200/34* (2013.01); *B60L 2200/12* (2013.01); *B60L 2200/46* (2013.01); *B60L 2200/40* (2013.01); *B60L 11/1822* (2013.01); *B62M 6/90* (2013.01); *Y02T 90/14* (2013.01); *Y02T 10/7072* (2013.01); *Y02T 10/7005* (2013.01); *Y02T 90/124* (2013.01); *B60L 2200/30* (2013.01); *B60L 2200/36* (2013.01)
USPC ...... 180/65.1; 180/19.1; 180/206.1; 180/220; 56/11.9

(58) Field of Classification Search
USPC .............. 180/6.5, 205.1, 206.1, 206.2, 206.3, 180/206.4, 206.5, 206.6, 206.7, 206.8, 220, 180/19.1, 65.1, 65.21, 65.225, 65.245, 180/65.25, 65.26, 65.51; 280/212; 56/11.9
See application file for complete search history.

(56) References Cited

U.S. PATENT DOCUMENTS

| | | | | |
|---|---|---|---|---|
| 4,280,578 A | * | 7/1981 | Perkins ......................... | 180/6.5 |
| 5,316,096 A | * | 5/1994 | Good ............................. | 180/19.1 |
| 5,931,245 A | | 8/1999 | Uetake et al. | |
| 5,984,038 A | * | 11/1999 | Fujiwara et al. ........... | 180/206.4 |

(Continued)

FOREIGN PATENT DOCUMENTS

| | | |
|---|---|---|
| CA | 2 310 974 C | 2/2002 |
| DE | 197 53 047 A1 | 5/1999 |

(Continued)

OTHER PUBLICATIONS

British Search Report dated Dec. 16, 2010 in British Patent Application No. GB1014238.8.

(Continued)

*Primary Examiner* — Joseph M Rocca
*Assistant Examiner* — Marc A Scharich
(74) *Attorney, Agent, or Firm* — Oliff PLC

(57) ABSTRACT

An electric wheeled apparatus comprises a main body, at least one wheel supported by the main body in a rotatable manner; an electric motor configured to apply torque to the at least one wheel, a battery interface configured to removably receive at least one battery pack which is originally designed as a power source of an electric power tool, and an electric circuit unit configured to electrically connect the at least one battery pack attached to the battery interface with the electric motor.

18 Claims, 23 Drawing Sheets

(56) References Cited

U.S. PATENT DOCUMENTS

| | | | |
|---|---|---|---|
| 6,039,137 A * | 3/2000 | Schless | 180/220 |
| 6,065,555 A * | 5/2000 | Yuki et al. | 180/19.1 |
| 6,826,895 B2 * | 12/2004 | Iida et al. | 56/11.9 |
| 7,014,949 B2 * | 3/2006 | Kanai et al. | 429/148 |
| 7,584,804 B2 * | 9/2009 | Fukuzumi et al. | 172/42 |
| 7,588,109 B2 * | 9/2009 | Wachendorf et al. | 180/202 |
| 7,610,975 B1 * | 11/2009 | Gust et al. | 180/65.245 |
| 8,653,786 B2 * | 2/2014 | Baetica et al. | 320/104 |
| 2004/0050603 A1 | 3/2004 | Jaeger | |
| 2007/0079998 A1 * | 4/2007 | Walter | 180/19.1 |
| 2007/0251738 A1 * | 11/2007 | Wachendorf et al. | 180/65.1 |
| 2009/0011325 A1 | 1/2009 | Agehara et al. | |
| 2010/0183910 A1 * | 7/2010 | Nishino et al. | 429/163 |
| 2011/0268999 A1 * | 11/2011 | Nagai | 429/53 |
| 2011/0272203 A1 * | 11/2011 | Sugimoto et al. | 180/206.1 |

FOREIGN PATENT DOCUMENTS

| | | |
|---|---|---|
| EP | 0 686 550 A1 | 12/1995 |
| EP | 0 965 261 A1 | 12/1999 |
| FR | 2 252 802 | 8/1975 |
| JP | A-10-84738 | 4/1998 |
| JP | A-2001-087024 | 4/2001 |
| JP | A-2001-143677 | 5/2001 |
| JP | A-2001-155700 | 6/2001 |
| JP | A-2001-210286 | 8/2001 |
| JP | A-2001-229895 | 8/2001 |
| JP | A-2002-321675 | 11/2002 |
| JP | A-2005-193864 | 7/2005 |
| JP | A-2005-295853 | 10/2005 |
| JP | A-2006-082792 | 3/2006 |
| JP | A-2006-156227 | 6/2006 |
| JP | A-2007-188717 | 7/2007 |
| JP | A-2008-62814 | 3/2008 |
| JP | A-2008-189136 | 8/2008 |
| WO | WO 97/10967 A1 | 3/1997 |

OTHER PUBLICATIONS

Apr. 8, 2013 Office Action issued in British Patent Application No. 1014238.8.

Sep. 3, 2013 Notification of Reason for Rejection issued in Japanese Patent Application No. 2009-265917 (with translation).

Mar. 4, 2014 Office Action issued in Japanese Patent Application No. 2009-265917 (w/ English Translation).

Aug. 1, 2014 French Search Report issued in National Registration No. FR1057190 with an English translation.

\* cited by examiner

FIG. 27
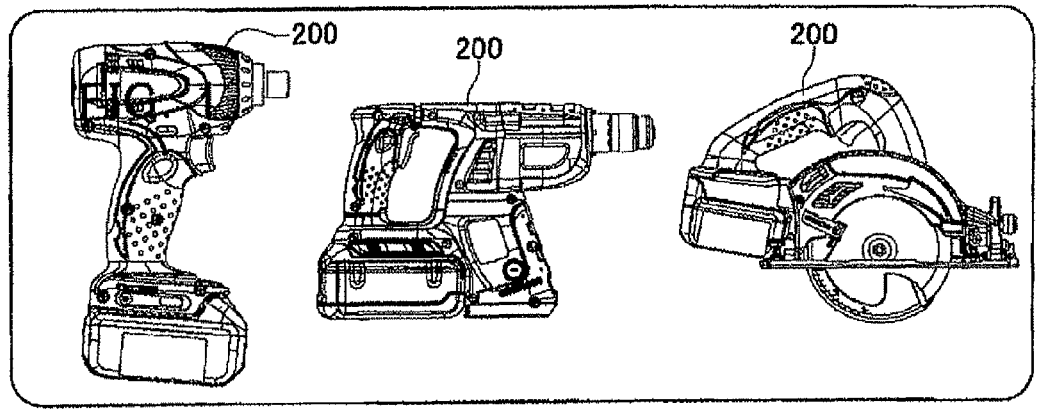
⇧ Usage as a Power Source for Driving Tool Bits
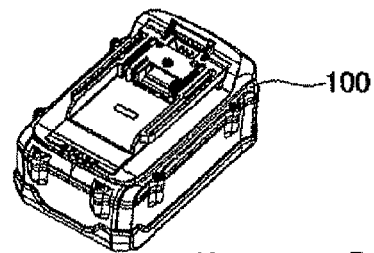
⇩ Usage as a Power Source for Driving Wheels
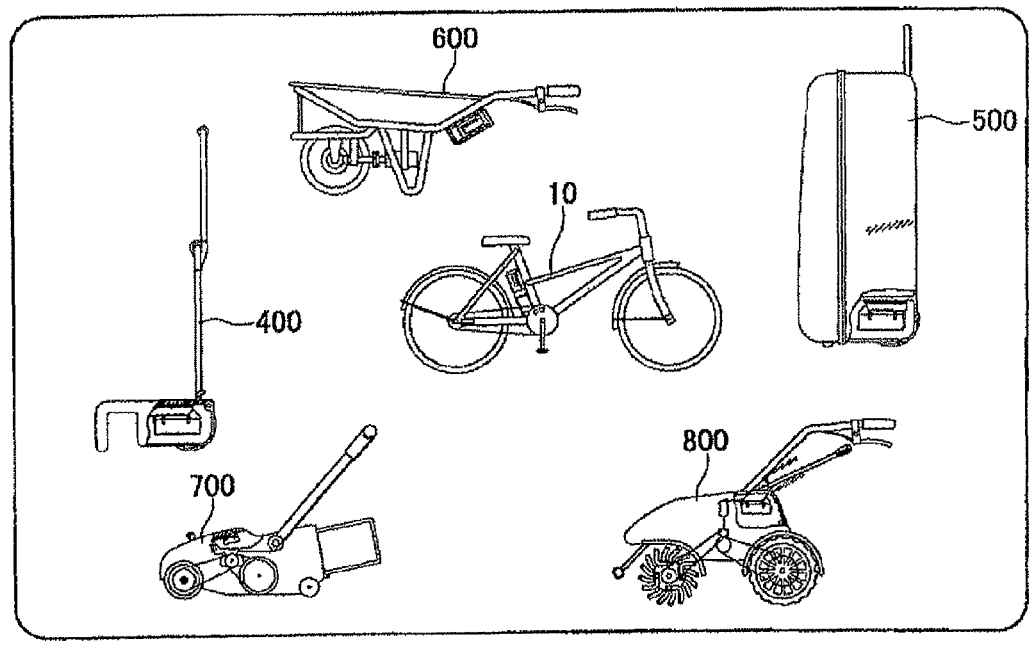

ELECTRIC WHEELED APPARATUS

CROSS-REFERENCE TO A RELATED APPLICATIONS

This application claims priority to Japanese Patent Application No. 2009-209175 filed on Sept. 10, 2010 and Japanese Patent Application No. 2009-265917 filed on Nov. 24, 2010, the contents of which are hereby incorporated by reference into the present application.

TECHNICAL FIELD

The present invention relates to an electric wheeled apparatus. In particular, the present invention relates to an electric wheeled apparatus that uses a rechargeable battery pack as a power source, and which has an electric motor that drives a wheel. Here, the electric wheeled apparatus includes vehicles ridden by people, such as electric bicycles (electric assist bicycles, hybrid bicycles), electric motorcycles, electric wheelchairs, electric automobiles, hybrid automobiles (not limited to those having an engine), various electric work vehicles (e.g., forklifts, sanitation vehicles), and electric toys that can be ridden, as well vehicles not ridden by people, such as electric carrier carts, electric lifters, electric unmanned carriers, and electric wirelessly operated toys. Furthermore, an electric wheeled apparatus also includes vehicles having endless treads that are driven by wheels (also known as a crawler track or Caterpillar (registered trademark)).

DESCRIPTION OF RELATED ART

An electric bicycle (one type of electric wheeled apparatus) is disclosed in Japanese Application Publication No. 2008-62814. This electric bicycle comprises two wheels that are rotatably provided on a vehicle body, pedals to which the user applies force, a user force transmission that transmits the force that was applied to the pedals to the wheels, an electric motor that applies torque to the wheels, and a battery pack that supplies electric power to the electric motor. With this type of electric bicycle, the electric power supplied from the battery pack to the electric motor will be adjusted in response to the force applied to the pedals by the user and the speed of the electric bicycle. The user can receive auxiliary force from the electric motor, and easily pump the pedals.

SUMMARY OF THE INVENTION

As with the aforementioned electric bicycle, a large number of electric wheeled apparatuses have been developed that use a rechargeable battery pack. With these types of electric wheeled apparatuses, a dedicated battery pack is used for each product, and the battery packs of other products cannot be used. Furthermore, with conventional electric wheeled apparatuses, countermeasures are taken to prohibit the use of battery packs from other products. Because of that, even if a user of an electric wheeled apparatus owns a large number of battery packs for a variety of other products, the user must use a dedicated charger in order to recharge that battery pack. As a result, the user must own many types of battery packs and chargers, and must manage the usage state and charge state of many different types of battery packs.

In regard to the aforementioned problems, the present inventors have focused on battery packs used for electric power tools. The reasons for that are as follows.

First, compared to battery packs for other portable devices, the battery packs used in electric power tools have a high output voltage and a large recharging capacity, and is sufficient for use as the power source in an electric wheeled apparatus. In addition, because there are many battery packs for electric power tools that are used in harsh conditions (such as outdoors, etc.), many superior technologies have been developed and employed therein, and the reliability of these products is excellent (i.e., they rarely break down).

Second, there are many users of electric power tools that own a plurality of battery packs for one electric power tool, so that the electric power tool can be used for a long period of time. However, because there is only a small chance that the electric power tool in fact is used for a long period of time, a frequency with which each battery pack is used is low, and as a practical matter, the battery packs that one owns are not made good use thereof. In this case, the battery packs for use in the electric power tools that the user owns can be effectively used if they can also be used in the electric wheeled apparatus. For example, the user who uses an electric power tool at work can use the battery pack for the electric power tool in the electric wheeled apparatus during leisure time.

Third, there are many electric power tools that are used in a variety of manufacturing plants and construction sites. The workers in the manufacturing plants and construction sites will sometime carry the electric power tools, as well as travel around work sites by the electric wheeled apparatuses. In this case, there hardly is any case that the workers use the electric wheeled apparatuses and the electric power tools at the same time. In other words, the electric power tool is rarely used while travelling on the electric wheeled apparatus, and the electric wheeled apparatus is rarely used while working with the electric power tool. Thus, if the electric wheeled apparatus can use the battery pack for the electric power tool, the battery pack can be used in the electric wheeled apparatus while the electric wheeled apparatus is being used, and the battery pack can be used in the electric power tool when work is being performed with the electric power tool. The battery pack can be effectively used, and also a number of battery packs that must be transported to the work site can be reduced. Alternatively, it is also possible that only the electric power tool is transported to the work site by an electric unmanned carrier, without any worker traveling on the electric unmanned carrier. Even in this case, by using the battery pack on the unmanned carrier when transporting the electric power tool, and using the same battery pack in the electric power tool at the work site, the battery pack for the electric power tool can be effectively used.

Based upon the aforementioned present teachings, a new and useful electric wheeled apparatus can be realized. This electric wheeled apparatus comprises a main body, a wheel that is rotatably provided on the main body, an electric motor that applies torque to the wheel, a battery interface that can removably receive a battery pack for an electric power tool, and an electric circuit unit that electrically connects the battery pack attached to the battery interface to the electric motor.

The electric wheeled apparatus can use the battery pack of the electric power tool as a power source, and a dedicated battery pack and charger are not necessary. The user of the electric power tool can also make good use of the battery pack for the electric power tool that the user owns in the electric wheeled apparatus. Because the battery pack is used frequently, it will not be wasteful to own multiple battery packs, and by owning multiple battery packs, it will become possible to use the electric power tool for a long period of time when needed.

The electric wheeled apparatus according to the present teachings includes all types of electric power tools, for example, electric drills that drive a drill bit with electric power, electric screwdrivers that drive a screwdriver bit with electric power, electric wrenches that drive a wrench bit with electric power, electric grinders that drive a whetstone with electric power, electric hammers that drive chisels with electric power, electric saws that drive a saw blade with electric power (including circular saws, reciprocal saws, and jigsaws), electric chain saws that drive a saw chain with electric power, electric impact hammers that drive an impact hammer with electric force (including tackers), electric garden tools that drive a cutter with electric power (including hedge trimmers, grass trimmers, manual push lawn mowers, and brush cutters), electric blowers that drive an air blowing fan with electric power, electric vacuums that drive a vacuum fan (including electric cleaners), and the like.

According to the electric wheeled apparatus of the present teachings, the user need not provide a dedicated battery pack or charger for the electric wheeled apparatus. The user can use the battery pack in an electric bicycle that the user prepared for use in the electric power tool. In another case, the user can use the battery pack that the user prepared for the electric bicycle in the electric power tool.

Fig, 23 is a side view that schematically shows a wheelbarrow of Embodiment 6.

Figure 24:
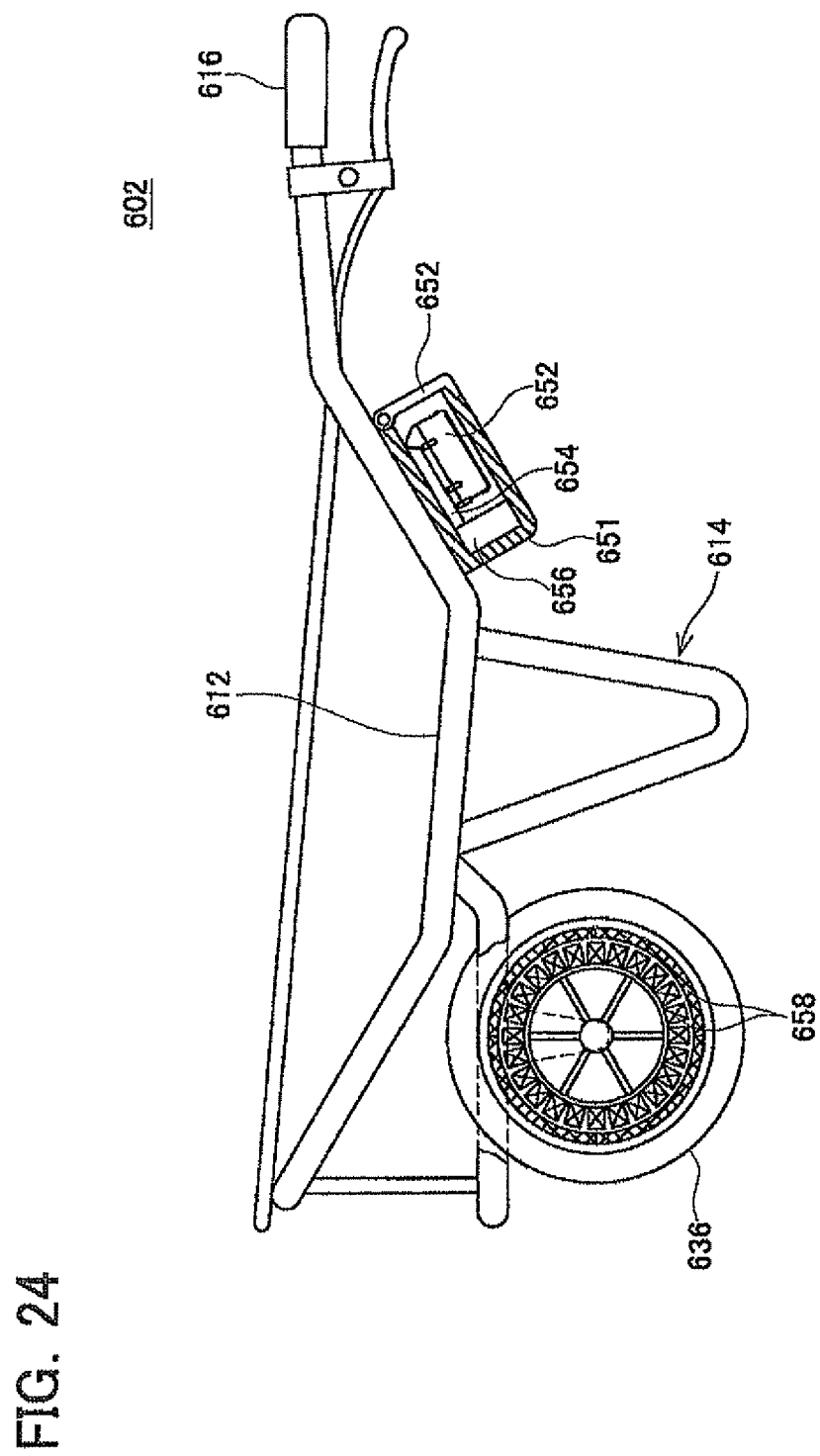

FIG. 24 is a side view that schematically shows a modification of the wheelbarrow of Embodiment 6.

Figure 25:
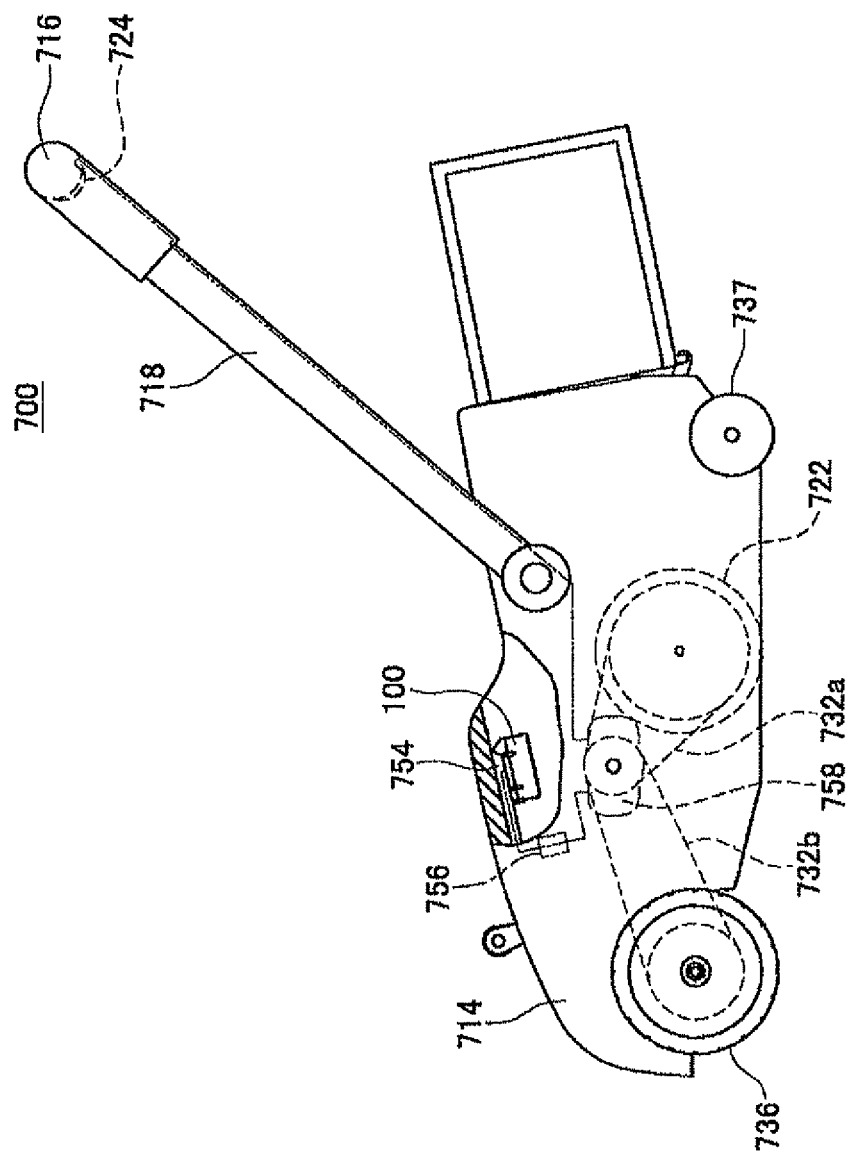

FIG. 25 is a side view that schematically shows an electric power mower of Embodiment 7.

Figure 26:
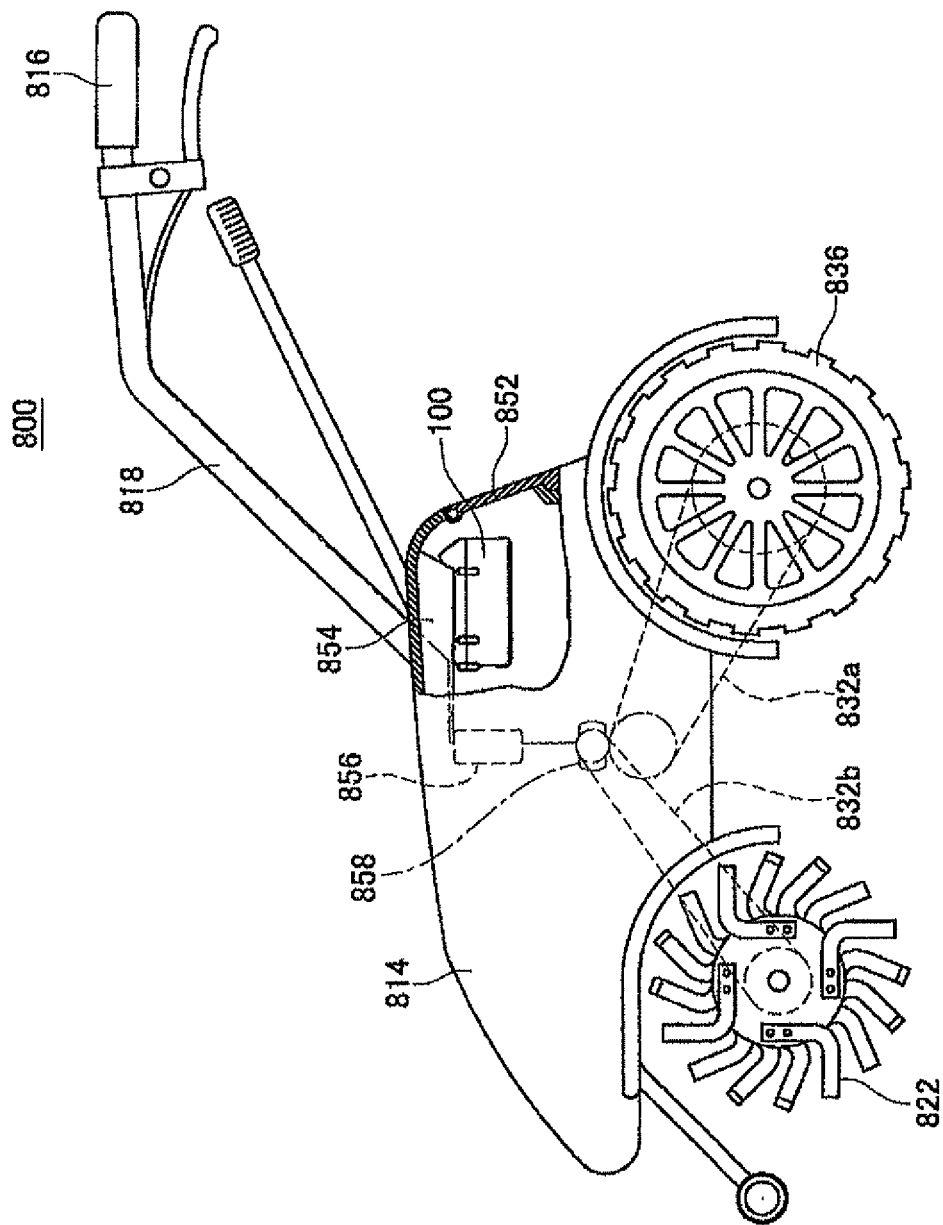

FIG. 26 is a side view that schematically shows an electric power cultivator of Embodiment 8.

FIG. 27 schematically shows a range of use of the battery pack for the electric power tool.

DETAILED DESCRIPTION OF THE INVENTION

In one embodiment of the present teachings, the battery interface can receive a plurality of battery packs for use in electric power tools, including a first battery pack and a second battery pack. According to this structure, the maximum distance and maximum output of the electric bicycle can be improved by using the plurality of battery packs.

In the aforementioned embodiment, an electric circuit unit may be configured such that a first battery pack and a second battery pack attached to a battery interface are connected in parallel. In this configuration, electric power can be supplied to an electric motor for a long period of time by connecting the plurality of battery packs in parallel. Thus, the maximum usage distance of an electric bicycle (which is an example of an electric wheeled apparatus) can be lengthened. In addition, when the electric circuit unit is configured such that the plurality of battery packs attached to the battery interface are connected in parallel, the electric circuit unit can electrically connect the battery packs attached to the battery interface to an electric motor. Thus, a user can change the number of battery packs attached to the battery interface e.g. in response to the distance in which the electric wheeled apparatus will be used. In other words, when usage over a short distance is planned, only one battery pack can be attached in the battery interface, and when usage over a long distance is planned, a plurality of battery packs can be attached to the battery interface. By changing the number of battery packs in accordance with the usage distance, the electric wheeled apparatus can be prevented from becoming too heavy.

In the aforementioned embodiment, it is preferable that the electric circuit unit is provided with at least two switching elements and is configured capable of electrically disconnecting each of the first and second battery packs by turning off a corresponding one of the at least two switching elements. According to this configuration, when one of the first and second battery packs has run out of charged power, the electric circuit can turn off the corresponding one of the switching element and prevent the exhausted pack battery pack from being over-discharged.

In another embodiment, the electric circuit unit may be configured capable of electrically connecting the first and second battery packs to the electric motor one by one. In this configuration, the electric circuit unit is capable of electrically connecting the first and second battery packs to the electric motor independently at different timings. For example, the electric circuit may electrically connect only the first battery pack to the electric motor, even when both the first and second battery packs are attached to the battery interface. And then, when the first battery pack has run out of charged power, the electric circuit can electrically connect the second battery pack to the electric motor in replacement of the first battery pack. According to this configuration, e.g. when a small amount of electric power is consumed by the electric motor, the charged power of the second battery pack is not consumed, and later the user do not have to charge the two battery packs, but to charge only the first battery pack.

In one embodiment of the present teachings, the electric circuit unit may be configured capable of electrically connecting the first and second battery packs in series with the electric motor when the first and second battery packs are attached to the battery interface. By connecting the plurality of battery packs in series, the electric circuit unit can supply a high voltage to the electric motor, and the maximum output power of the electric wheeled apparatus can be improved.

In one embodiment of the present teachings, the electric wheeled apparatus may be an electric bicycle, and further comprise pedals to which a user applies force, and a user force transmission that transmits the force applied to the pedals to at least one wheel. In this electric bicycle, even when all of the electric power of the battery pack has been used by the electric power tool, the user can travel with the electric bicycle by pumping the pedals similarly to a normal bicycle. Furthermore, the electric bicycle may also be configured to generate electricity by the electric motor during the user travel by pumping the pedals, and thus recharge the battery pack. Here, the electric bicycle is not limited to a two-wheeled vehicle, and includes unicycles and tricycles. The number of wheels of the electric bicycle is not particularly limited.

In the aforementioned electric bicycle, the electric circuit unit preferably adjusts the electric force supplied to the electric motor from the battery pack in response to the force applied to the pedals by the user. In this configuration, the user can be sufficiently assisted when starting out or climbing a hill, and a speed of the electric bicycle can be prevented from becoming excessive when on a flat terrain.

In another embodiment of the present teachings, the electric wheeled apparatus may be configured such that one or a plurality of battery packs having a nominal voltage of 14.4 volts, battery packs having a nominal voltage of 18 volts, and battery packs having a nominal voltage of 36 volts, can be used. Furthermore, the electric wheeled apparatus may also be configured such that battery packs having a nominal voltage that exceed 100 volts can be used. The output voltage of the battery packs is not particularly limited. The electric wheeled apparatus may also be configured such that only battery packs having a predetermined output voltage can be used, or may be configured such that a plurality of battery pack types having different output voltages can be used.

According to another embodiment of the present teachings, the electric wheeled apparatus can have front and rear wheels. However, the electric wheeled apparatus is not limited to two wheels, and may have only one wheel (a unicycle) or three wheels or more. With an electric wheeled apparatus having a plurality of wheels, the electric motor may apply torque to only one wheel, or the electric motor can apply torque to a plurality of wheels.

In another embodiment of the present teachings, the electric wheeled apparatus is an electric bicycle having a front wheel and a rear wheel, and in which the force applied by the user to the pedals is transmitted to the rear wheel via a chain. In addition, the torque output by the electric motor is transmitted to the rear wheel via a drive chain. However, the electric bicycle may be configured such that the torque output by the electric motor is applied to the front wheel. In this case, the electric motor can e.g. be arranged on a hub of the front wheel. The wheel to which the force from the user is applied, and the wheel to which the torque of the electric motor is applied, may be the same or may be different.

According to another embodiment of the present teachings, the electric wheeled apparatus may be configured such that the battery interface can removably receive battery packs having a variety of different shapes. With this configuration, an adaptor may be interposed between the battery interface and the battery packs.

In another embodiment of the present teachings, the battery interface has at least one pack receiving portion. A connector provided on the battery pack is removably receivable on the pack receiving portion of the battery interface. Here, the connector on the battery pack is also removably receivable on the pack receiving portion provided on an electric power tool.

In another embodiment of the present teachings, the electric wheeled apparatus can be a suitcase or electric power tool case that comprises a case main body that contains an object, wheels provided on the case main body, and an electric motor that drives the wheels. In this case, it is preferable that the attachment and removal of the battery pack with respect to the battery interface be possible from only the inside of the case main body.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric wheeled apparatus.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

(Embodiment 1)

Figure 1:
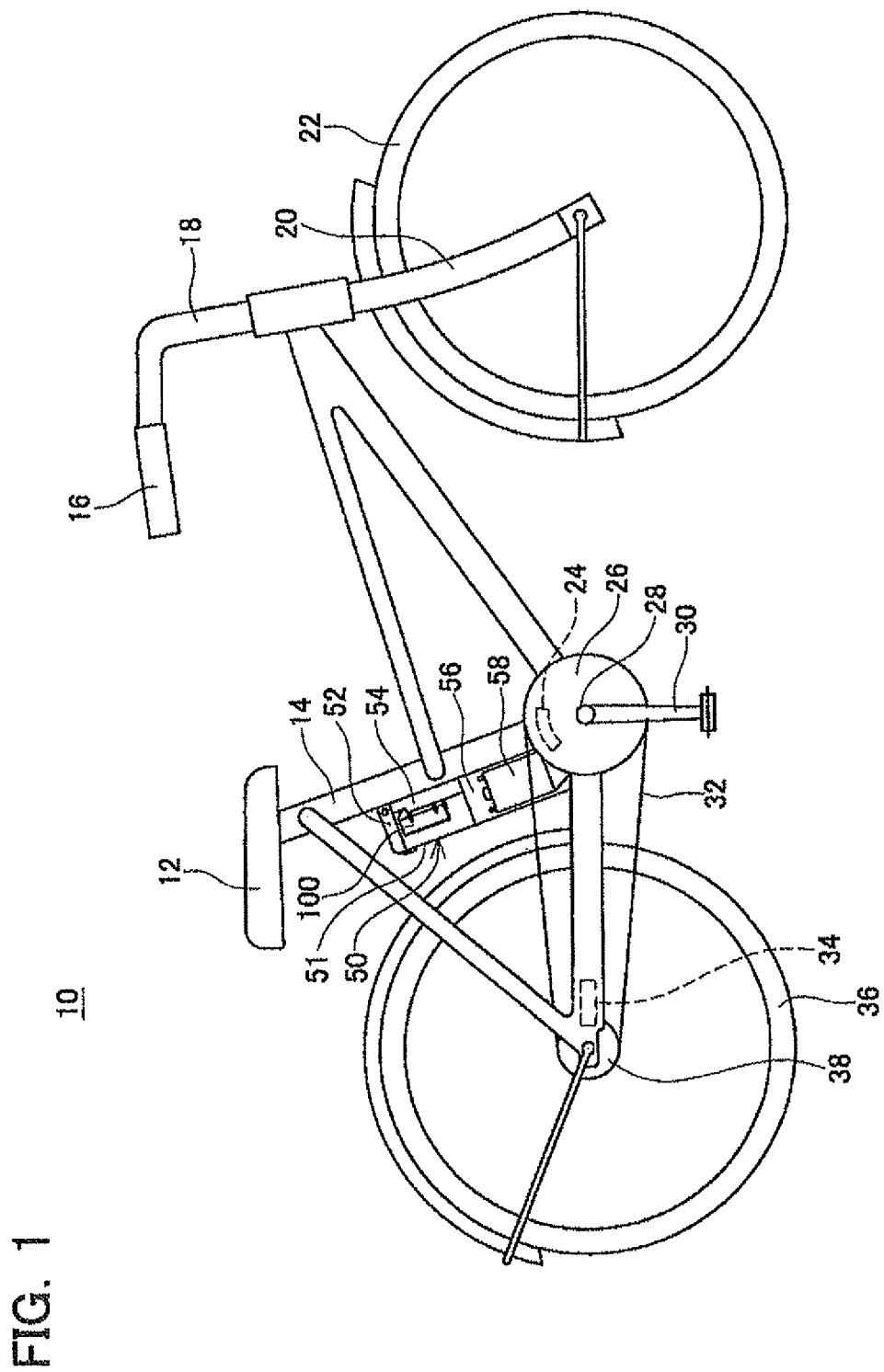
FIG. 1 schematically shows an electric bicycle of one embodiment.

An electric bicycle 10 of Embodiment 1 will be described with reference to the drawings. The electric bicycle 10 is an example of an electric bicycle in which the present teachings have been realized. As shown in FIG. 1, the electric bicycle 10 has a front wheel 22 and a rear wheel 36 rotatably provided on a main body 14. The main body 14 has a stem 18 that is pivotable. The stem 18 includes a fork 20 that rotatably supports the front wheel 22, and a handle 16 that is grasped by a user. Brake levers (not illustrated in the drawings) are provided on both ends of the handle 16.

The electric bicycle 10 has a saddle 12 on which a user sits, and crank pedals 30 on which the user applies pedal force. The crank pedals 30 have a shaft 28 that is rotatably supported by the main body 14.

The electric bicycle 10 comprises a drive sprocket 26 that is concentrically fixed on the central shaft 28 of the crank pedals 30, a driven sprocket 38 that is concentrically fixed on the rear wheel 36, and a chain 32 that extends around both the drive sprocket 26 and the driven socket 38. The drive sprocket 26, the driven sprocket 38, and the chain 32 compose a user force transmission that transmits the force applied to the crank pedals 30 to the rear wheel 36. Here, the user force transmission is not limited to a transmission mechanism that uses the chain 32; alternatively, may be a transmission mechanism that uses a transmission belt, or may be a transmission mechanism that uses a rotation shaft.

The electric bicycle 10 comprises an electric assist unit 50. The electric assist unit 50 has a battery interface 54, an electric circuit unit 56, and an electric motor 58 installed inside a case 51 having an openable cover 52. The case 51 is closed by closing the cover 52, which prevents the intrusion of moisture and dirt. The electric motor 58 is a DC brushless motor having an output of 240 watts. Note that the shape of the electric motor 58 is not particularly limited. A battery pack 100 is removably received in the battery interface 54. Although additional details will be provided below, the battery pack 100 is a battery pack that is used in an electric power tool. The electric circuit unit 56 comprises a circuit for connecting the battery interface 54 with the electric motor 58, and controlling the operation of the electric motor 58. In addition, the electric bicycle 10 also includes a user force sensor 24 that serves to measure the force applied to the crank pedals 30 by the user, and a speed sensor 34 that serves to measure the speed of the electric bicycle 10. Note that the user force sensor 24 uses a distortion sensor that measures the distortion produced by the drive sprocket 26, and the speed sensor 34 uses a pulse counter that measures the number of rotations of the rear wheel 36.

Figure 3:
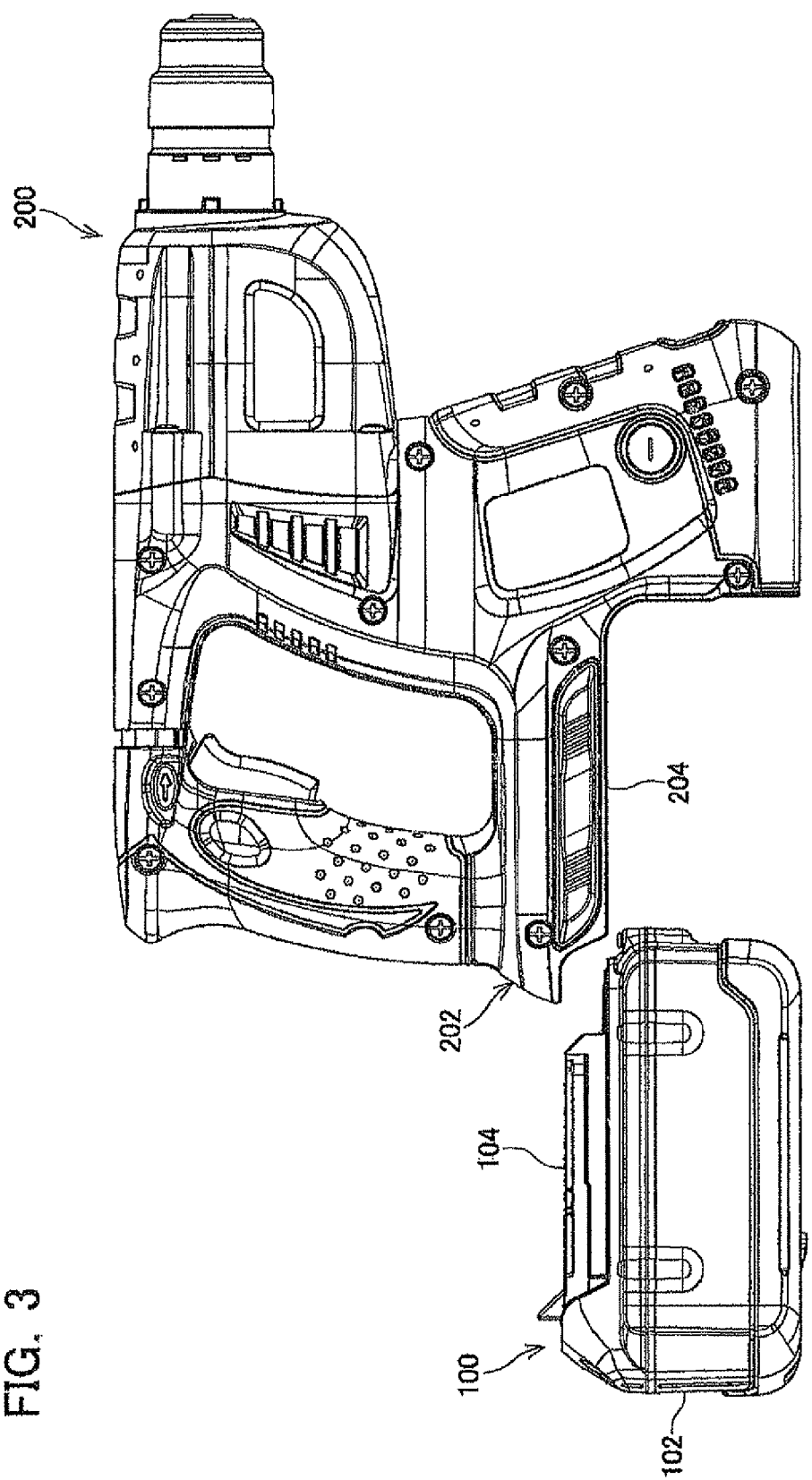
FIG. 3 shows the electric power tool that removably receives the battery pack.
Figure 4:
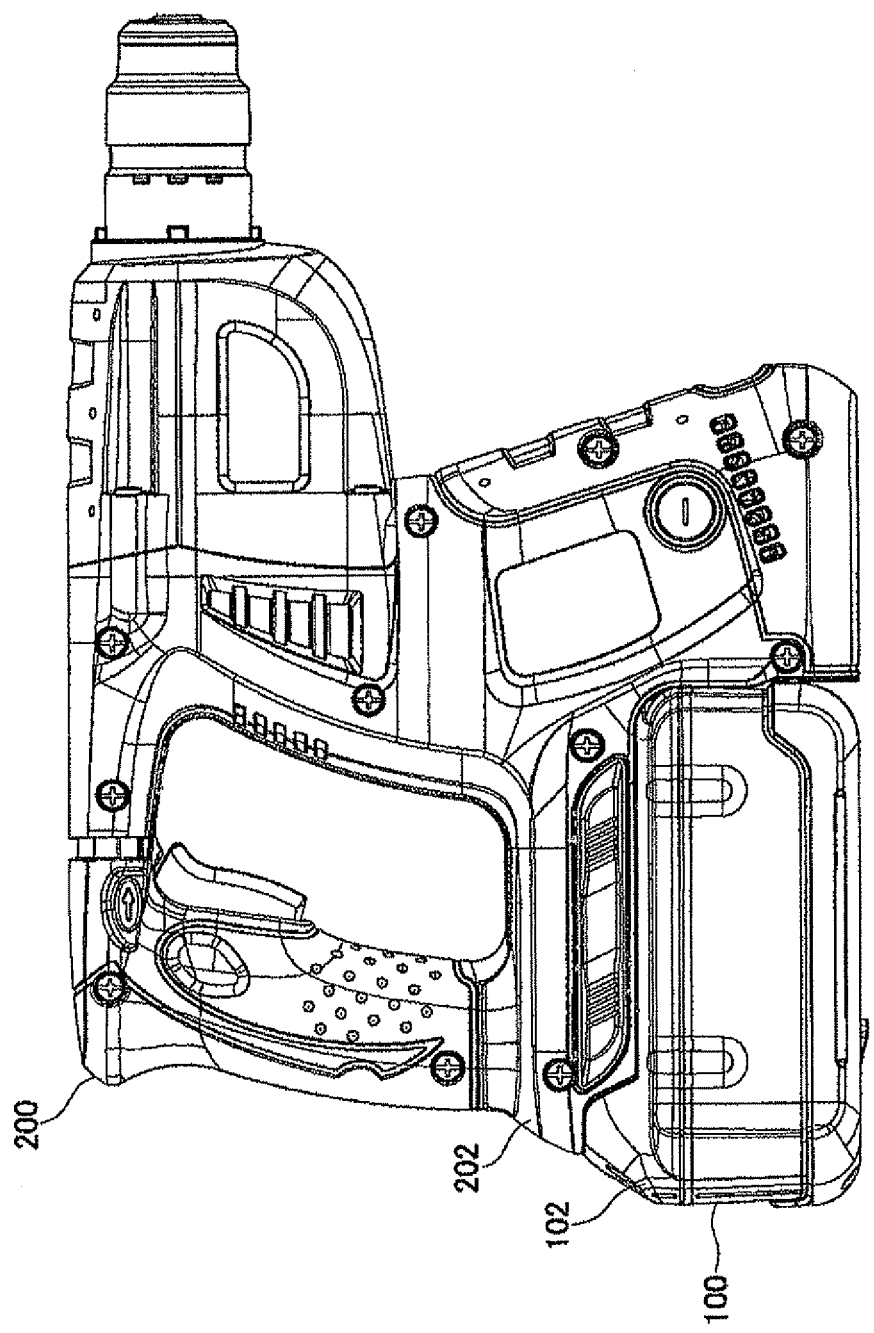
FIG. 4 shows the electric power tool in which the battery pack is attached.

Next, the battery pack 100 will be described with reference to FIGS. 2, 3 and 4. The battery pack 100 used by the electric bicycle 10 of the present embodiment is a battery pack 100 that is used in an electric power tool 200. Here, an electric hand drill is illustrated in FIGS. 3 and 4 as an example of the electric power tool 200. The battery pack 100 is a slide-type battery pack, and an engagement portion 104 is provided on the upper surface of a housing 102. The housing 202 of the electric power tool 200 includes a pack receiving portion 204 in which the engagement portion 104 of the battery pack 100 is received. The pack receiving portion 204 of the electric power tool 200 removably receives the battery pack 100, and has a plurality of terminals (not illustrated in the drawings) that electrically connect the attached battery pack 100.

The battery pack 100 is equipped with a plurality of secondary battery cells (not illustrated in the drawings). The secondary battery cells are lithium ion secondary battery cells.

The battery pack 100 is equipped with 10 secondary battery cells, in which groups of two secondary battery cells are connected in parallel and these 5 groups are connected together in series. The lithium ion secondary battery cells have an output voltage (nominal) of 3.6 volts, and the output voltage (nominal) of the battery pack 100 of the present embodiment is 18 volts. The electric power tool 200 can drive an electric motor provided therein by the electric power supplied from the attached battery pack 100.

Here, the type of secondary battery cells in the battery pack 100 used in the electric bicycle 10 is not particularly limited. In addition, the number of battery cells provided in the battery pack 100 is not particularly limited, and there is no particular limit on the output voltage of the battery pack 100. The electric bicycle 10 can, for example, also use battery packs having an output voltage of 14.4 volts, 18 volts, or 36 volts, and can also use battery packs whose output voltage exceeds 100 volts. Design modifications may be made in response to the voltage of the battery pack 100 that is needed.

Figure 2:
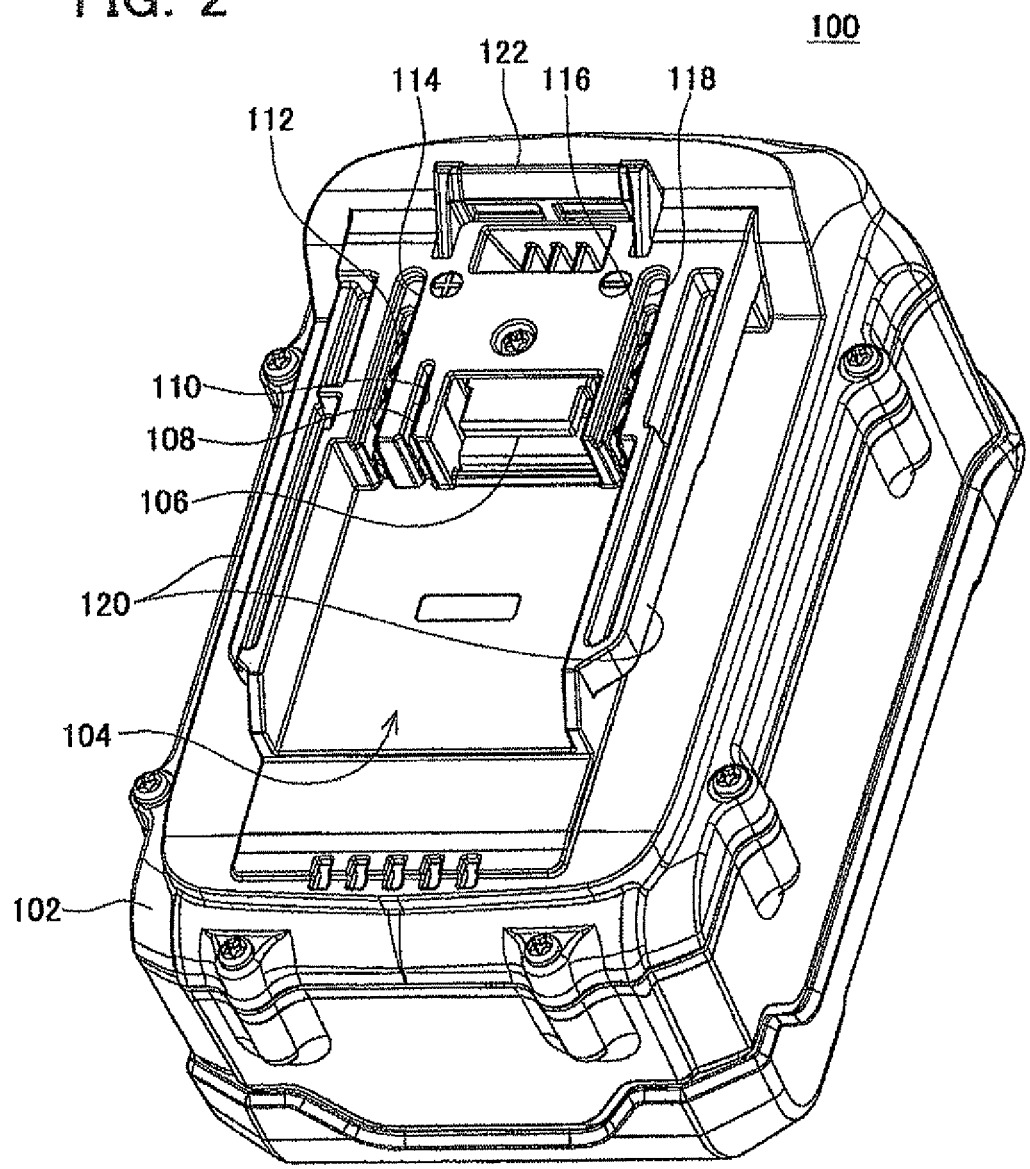
FIG. 2 shows a battery pack for an electric power tool.

As shown in FIG. 2, the engagement portion 104 of the battery pack 100 has a pair of ribs 120 that extends parallel to each other, and an engagement hook 122 that is urged by an elastic force. The engagement portion 104 is provided with a positive terminal 112, a negative terminal 116, a temperature terminal 108, and communication terminals 106. The positive terminal 112, negative terminal 116, and temperature terminal 108 are housed in the interior of slits 114, 110, and 118. The positive terminal 112 and the negative terminal 116 are connected to the secondary battery cells housed in the battery pack 100, The temperature terminal 108 is connected to a thermistor (not illustrated in the drawings) that is housed in the battery pack 100, and will output a voltage in response to the temperature of the secondary battery cells. The communication terminals 106 are connected to a controller (not illustrated in the drawings) that is housed in the battery pack 100.

Figure 5:
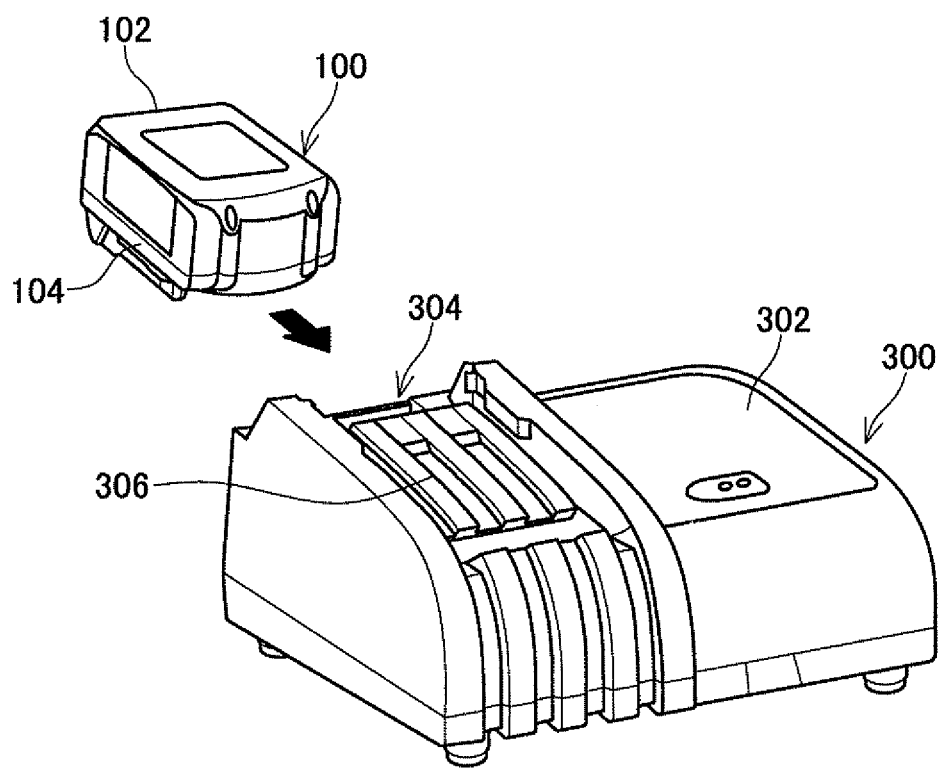
FIG. 5 shows a charger that recharges the battery pack.

As shown in FIG. 5, the battery pack 100 can be repeatedly recharged by a charger 300. A housing 302 of the charger 300 is provided with a pack receiving portion 304 that receives the engagement portion 104 of the battery pack 100. The pack receiving portion 304 is provided with a variety of terminals and connectors that electrically connect to the battery pack 100, and a terminal cover 306 that protects these terminals and connectors. The charger 300 removably receives the battery pack 100, and charges the battery pack 100 attached therein. The charger 300 can adjust the charge current supplied to the battery pack 100 in response to the temperature and voltage of the secondary battery cells of the battery pack 100.

Figure 6:
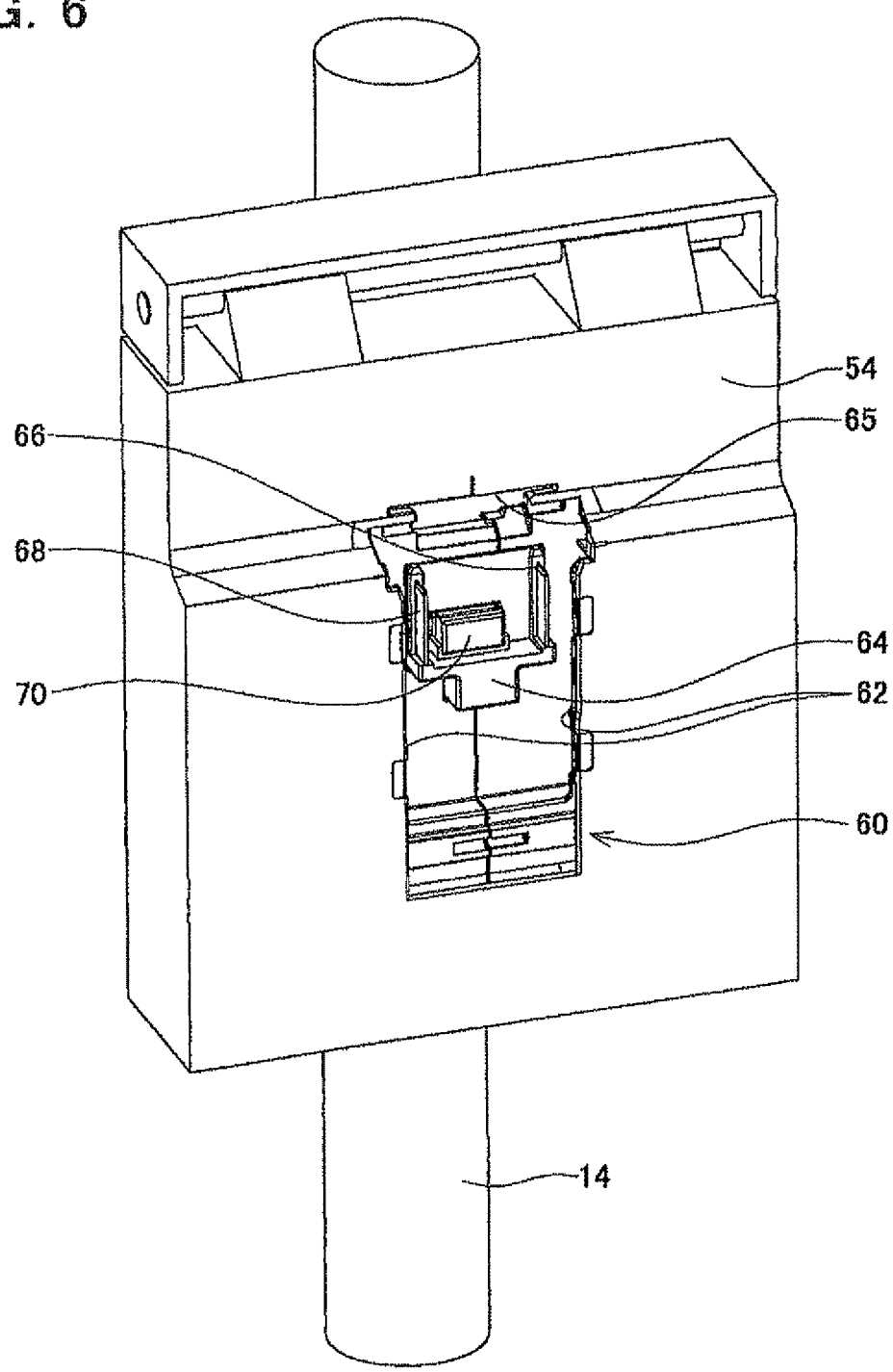
FIG. 6 shows a battery interface of Embodiment 1.
Figure 7:
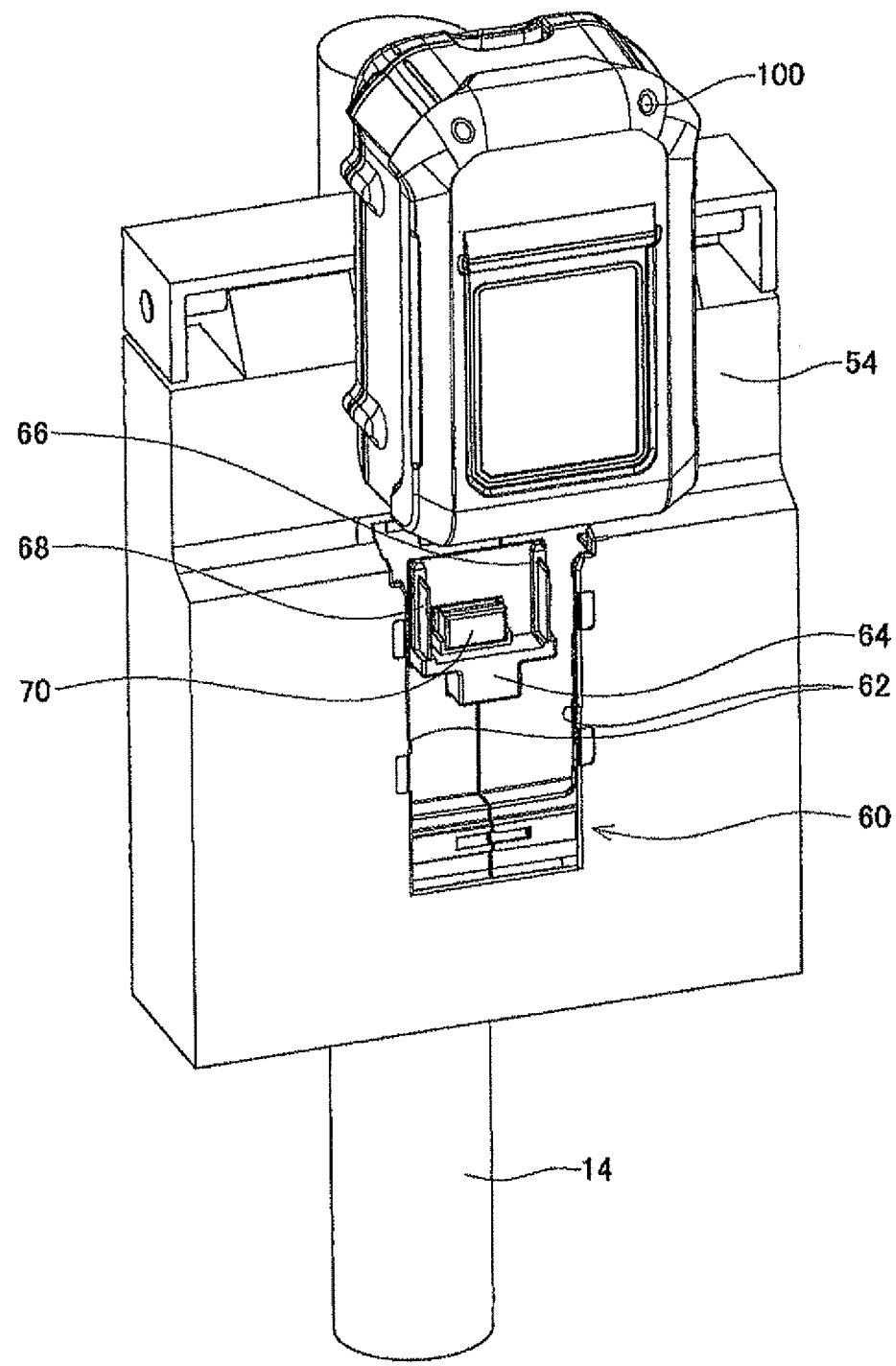
FIG. 7 shows the battery pack attached to the battery interface.
Figure 8:
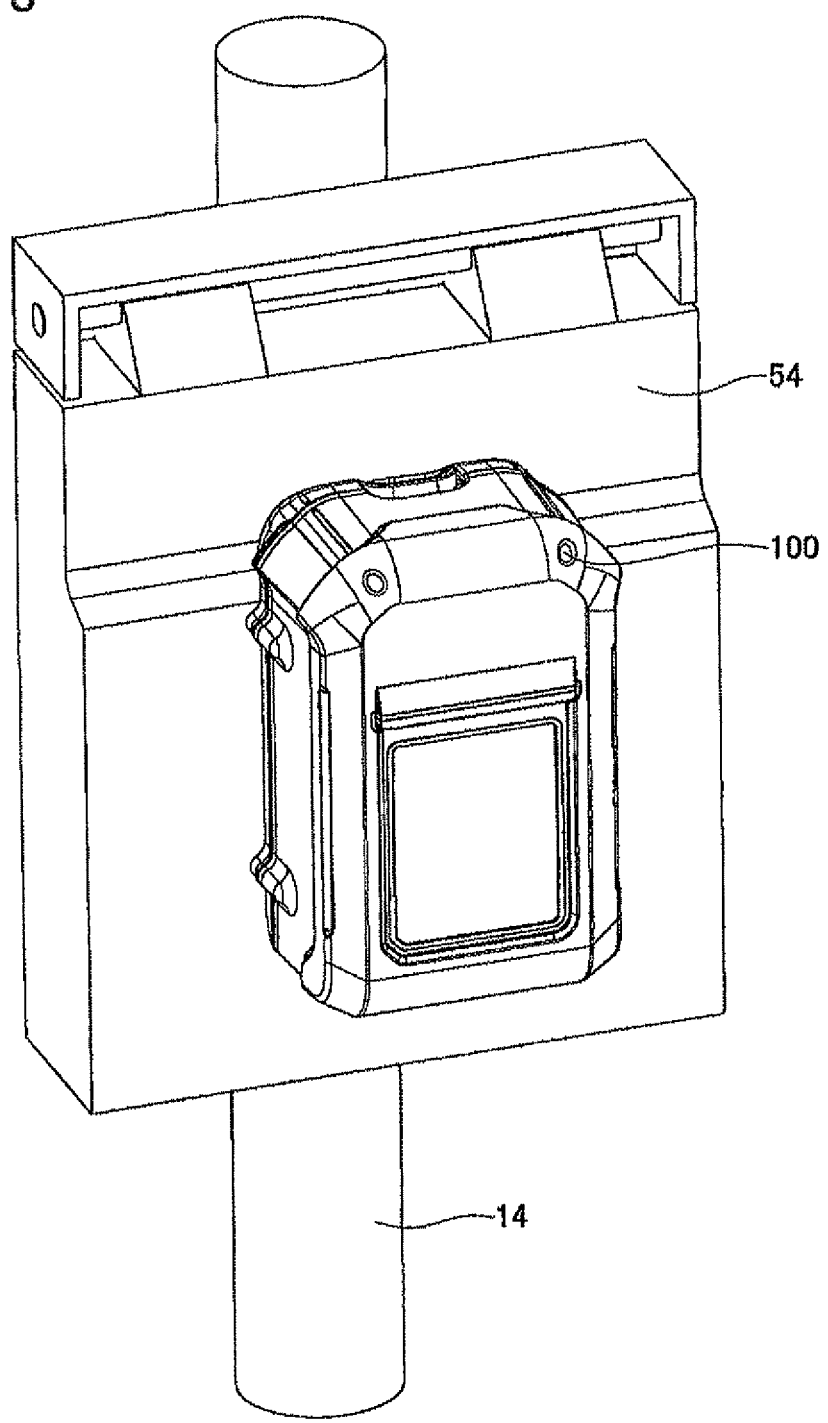
FIG. 8 shows the battery interface of Embodiment 1 in which the battery pack is attached.

We now return to the description of the electric bicycle 10. As shown in FIGS. 6, 7 and 8, the pack receiving portion 60 that receives the battery pack 100 is formed in the battery interface 54 of the electric bicycle 10. The pack receiving portion 60 comprises a pair of ribs 62 that engages with the engagement portion 104 of the battery pack 100 and an engagement hole 65. The pair of ribs 62 of the pack receiving portion 60 engages with the pair of ribs 120 provided in the battery pack 100, and the engagement hole 65 of the pack receiving portion 60 receives the engagement hook 122 of the battery pack 100. The pack receiving portion 60 removably receives the engagement portion 104 of the battery pack 100, and can firmly grasp the housing 102 of the attached battery pack 100.

A connector plug 64 is provided on the pack receiving portion 60. The connector plug 64 electrically connects the attached battery pack 100 with the pack receiving portion 60. The connector plug 64 comprises a positive connection terminal 66 that connects to the positive terminal 112 of the battery pack 100, a negative connection terminal 68 that connects to the negative terminal 116 of the battery pack 100, and a communication connector 70 that connects to the communication terminals 106 of the battery pack 100.

Figure 9:
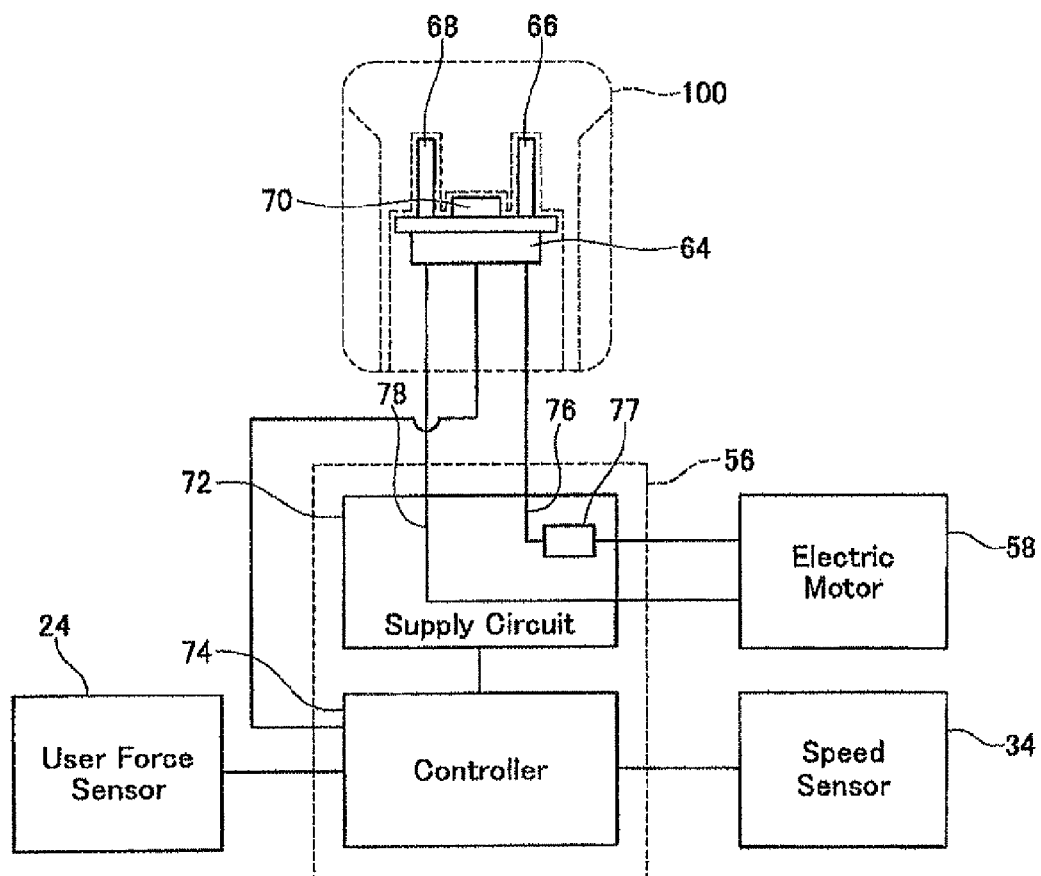
FIG. 9 shows a block diagram that shows an electrical layout of an electric bicycle.

Next, the electrical configuration of the electric bicycle 10 will be described with reference to FIG. 9. As shown in FIG. 9, the electric circuit unit 56 comprises a supply circuit 72 and a controller 74. The supply circuit 72 electrically connects the connector plug 64 and the electric motor 58, and supplies electric power from the battery pack 100 connected to the connector plug 64 to the electric motor 58. The supply circuit 72 comprises a positive electric power line 76 that electrically connects the positive terminal connector terminal 66 of the connector plug 64 to the electric motor 58, a negative electric power line 78 that electrically connects the negative terminal connector terminal 68 of the connector plug 64 to the electric motor 58, and an electric power adjustment circuit 77 that is provided on the positive electric power line 76. The electric power adjustment circuit 77 is a circuit that adjusts the electric power supplied from the battery pack 100 to the electric motor 58. The supply circuit 72 adjusts the electric power supplied from the battery pack 100 to the electric motor 58 by using the electric power adjustment circuit 77 in accordance with a command from the controller 74. Here, the electric power adjustment circuit 77 has a field effect transistor, and adjusts the electric power supplied to the motor 58 by controlling the duty ratio of the field effect transistor.

The controller 74 is configured to use a microcomputer. The controller 74 is connected to the user force sensor 24, the speed sensor 34, and a communication connector 70 of the connector plug 64. The controller 74 determines a target value of the electric force supplied to the electric motor 58 in response to the measurement results of the user force sensor 24 and the speed sensor 34. In other words, it will determine the torque applied to the rear wheel 36 by the electric motor 58. Then, the controller 74 will use the target value of the determined electric power to provide a command to the supply circuit 72. The controller 74 will, for example, increase the target value of the electric power supplied to the electric motor 58 as the force detected by the user force sensor 24 increases. In this configuration, the user can be greatly helped when starting out or climbing a hill. In addition, the controller 74 will lower the target value of the electric power supplied to the electric motor 58 as the speed detected by the speed sensor 34 increases. In this configuration, excessive speed can be prevented with the electric bicycle 10. The user can receive an appropriate amount of assistance from the electric motor 58, and can easily travel a route that is a long distance or has a high vertical interval by the electric bicycle 10.

The electric bicycle 10 of the present embodiment can use the battery pack 100 for the electric power tool 200 as a power source, and does not need a dedicated battery pack or charger. The user of the electric power tool 200 can also effectively use the battery pack for the electric power tool 200 on the electric bicycle 10. In addition, assuming that the user also uses the electric bicycle 10, if the user owns a large number of battery packs 100 for use with the electric power tool 200, the user can also use the electric power 200 for a long period of time by sequentially using these battery packs 100. In addition, in the event that the user is to carry the electric power tool 200 and ride the electric bicycle 10 to a work site, the user can use the battery pack 100 when travelling to the work site and when working at the work site. Different from a combination of a conventional electric bicycle and electric power tool, since it is not necessary to install separate dedicated battery packs for the electric bicycle and the electric power tool respectively, the number of objects carried when travelling to the work site can be reduced. Furthermore, the irritation of managing a plurality of types of battery packs will also be eliminated.

(Embodiment 2)

An electric bicycle of Embodiment 2 will be described. The electric bicycle of Embodiment 2 is the electric bicycle 10 of Embodiment 1, in which the battery interface 54 and supply circuit 72 have been changed. Because the configuration of the other aspects of the electric bicycle of Embodiment 2 has not been particularly changed, duplicate description will be omitted by applying the same reference numbers.

Figure 10:
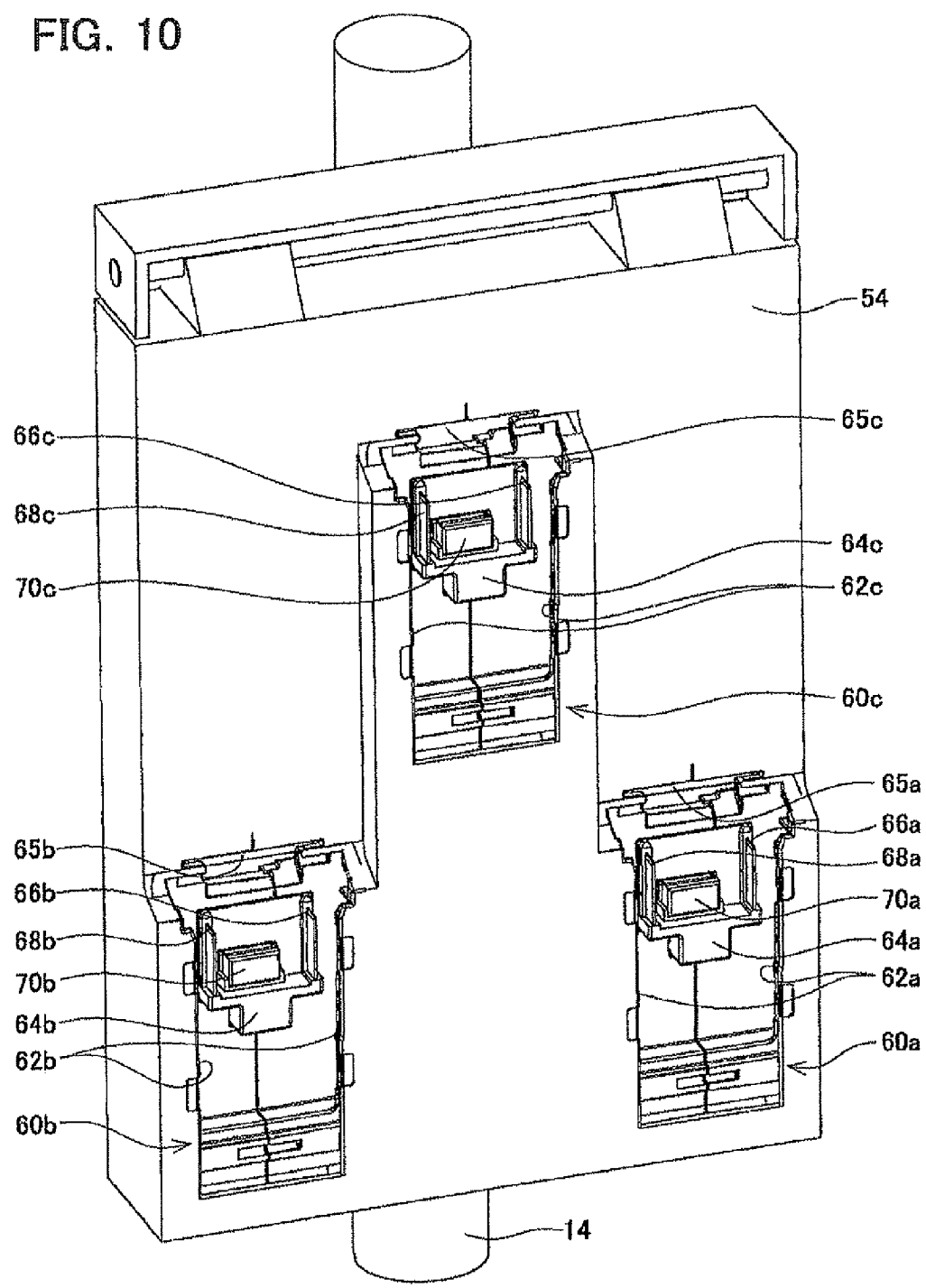
FIG. 10 shows a battery interface of Embodiment 2, in which a plurality of battery packs is removably receivable.

As shown in FIG. 10, the electric bicycle 10 of Embodiment 2 is provided with three pack receiving portions 60a, 60b, 60c in the battery interface 54, and removably receive a maximum of three battery packs 100a, 100b, 100c (hereinafter sometimes abbreviated as battery packs 100). Similar to Embodiment 1, each pack receiving portion 60a, 60b, 60c is provided with a pair of ribs 62a, 62b, 62c and a connection plug 64a, 64b, 64c. Each connection plug 64a, 64b, 64c comprises a positive terminal connection terminal 66a, 66b, 66c, a negative terminal connection terminal 68a, 68b, 68c, and a communication connector 70a, 70b, 70c. Here, the battery interface 54 may also be configured to removably receive two battery packs 100, and may alternatively be configured to removably receive a number of battery packs 100 in excess of three.

Figure 11:
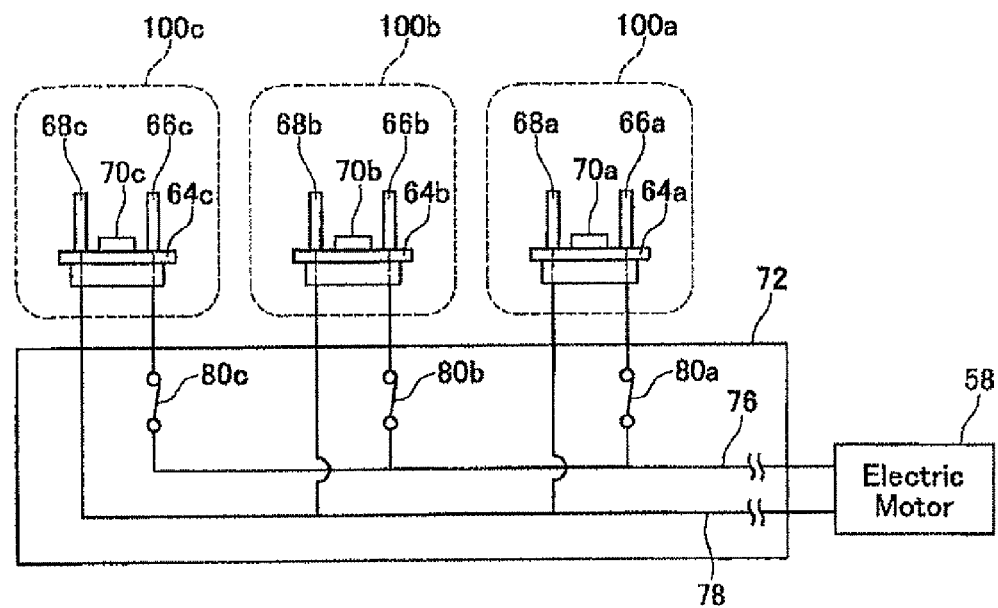
FIG. 11 shows a supply circuit of Embodiment 2 that connects the plurality of battery packs in parallel.

The changed portions of the supply circuit 72 will be described with reference to FIG. 11. As shown in FIG. 11, the supply circuit 72 of Embodiment 2 can connect the plurality of attached battery packs 100 in parallel with the electric motor 58. In other words, with the supply circuit 72 of Embodiment 2, the positive terminal connection terminals 66a, 66b, 66c of each connection plug 64a, 64b, 64c are connected to the positive electric power line 76, and the negative terminal connection terminals 68a, 68b, 68c of each connection plug 64a, 64b, 64c are connected to the negative electric power line 78.

In the present embodiment, electric power can be supplied to the electric motor 58 by the three battery packs 100 connected in parallel. Thus, it will be possible to supply a great deal of electric power to the electric motor 58, and the cruising time and cruising distance travelled by the electric bicycle 10 can be increased.

Figure 12:
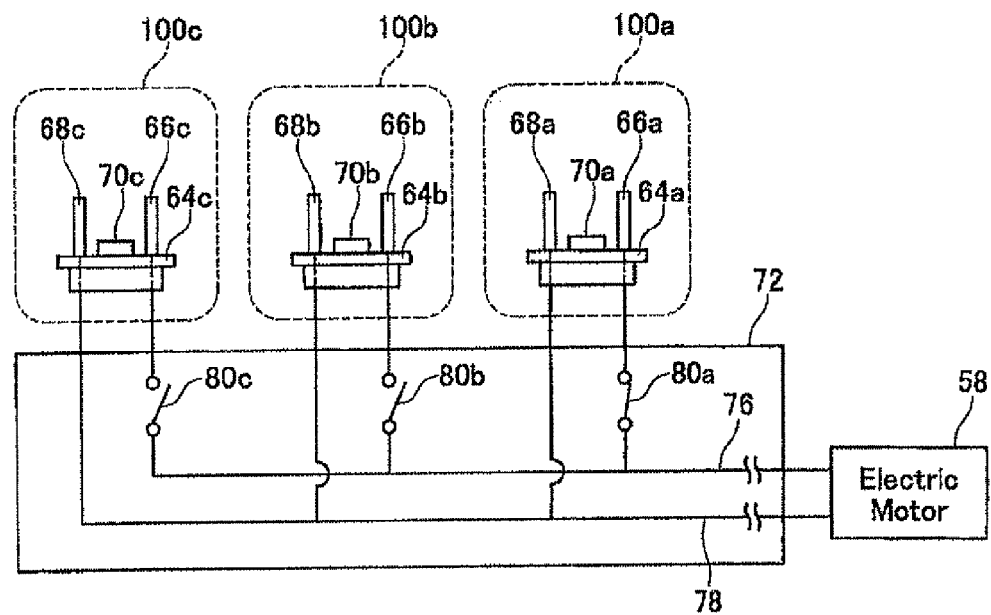
FIG. 12 shows a supply circuit of Embodiment 2 that electrically disconnects some of the battery packs.

Furthermore, in the supply circuit 72, the positive terminal connection terminals 66a, 66b, 66c of the respective connection plugs 64a, 64b, 64c are connected to the positive power line 76 via switch circuits 80a, 80b, 80c, respectively. The switch circuits 80a, 80b, 80c are each switched on and off by a command from the controller 74. As shown in FIG. 12, the supply circuit 72 can electrically disconnect some of the three attached battery packs 100 from the electric motor 58 by turning off some of the switch circuits 80a, 80b, 80c. Accordingly, for example, when the charge state of one battery pack 100a has dropped below a predetermined threshold, the supply circuit 72 can turn off the corresponding switch circuit 80a in order to prevent the over-discharge of the battery pack 100a. The controller 74 can estimate the charge state of each battery pack 100 by monitoring the output voltage of each battery pack 100. Then, the controller 74 can selectively turn off the switch circuits 80a, 80b, 80c based upon the estimate charge state of the battery packs 100. Note that another configuration is also possible in which a display unit (not illustrated in the drawings) is provided that displays the charge state of each battery pack 100 to the user, and the user will decide by him or her self to switch the switch circuits 80a, 80b, 80c by an operation panel (not illustrated in the drawings).

Alternatively, the supply circuit 72 can also sequentially switch among the three attached battery packs 100 to a battery pack 100 that will supply electric power to the electric motor 58. In other words, the supply circuit 72 will first connect only the first battery pack 100a to the electric motor 58, and supply electric power from only the first battery pack 100a to the electric motor 58. If the charge state of the first battery pack 100a is depleted, the supply circuit 72 will electrically disconnect the first battery pack 100a, connect the second battery pack 100b to the electric motor 58, and supply electric power from only the second battery pack 100b to the electric motor 58. Then, if the charge state of the second battery pack 100b is depleted, the supply circuit 72 will electrically disconnect the second battery pack 100a, connect the third battery pack 100c to the electric motor 58, and supply electric power from only the third battery pack 100c to the electric motor 58. With this method, in the same way as when supplying electric power from three battery packs 100 simultaneously, the cruising time and cruising distance of the electric bicycle 10 can be increased. Furthermore, according to this method, in the event that the electric bicycle 10 is to be used for a short distance and amount of time, the second and third battery packs 100*b*, 100*c* can be stored without being discharged, and the number of battery packs 100 to be charged thereafter can be reduced.

The switching of the aforementioned battery packs 100 can be performed by the controller 74. In this case, the controller 74 will monitor the output voltage of the first battery pack 10 connected to the electric motor 58, and at the point at which the output voltage of the first battery pack 100*a* falls to a predetermined value, the controller 74 will turn off the corresponding switch circuit 80*a*, and turn on the switch circuit 80*a* corresponding to the second battery pack 100*b*. By switching this procedure, the controller 74 can sequentially switch the battery pack 100 that supplies electric power to the electric motor 58. However, the electric bicycle 10 may also be configured such that switching the battery pack 100 does not depend on the controller 74, but instead will be determined by the user by an operation panel (not illustrated in the drawings).

Here, when for example the user continues to climb a long incline, and a great deal of electric power continues to be supplied from battery pack 100*a* to the electric motor 58, the temperature of the battery pack 100*a* may abnormally increase. In this type of situation, the electric bicycle 10 will preferably temporarily connect the other battery packs 100*b*, 100*c* to the electric motor 58. In other words, the electric bicycle 10 will preferably connect the battery pack 100*a* that is already being used to the other battery packs 100*b*, 100*c* in parallel. In this configuration, the current flowing from the battery pack 100a can be reduced, and the temperature increase of the battery pack 100*a* can be largely prevented. Note that the temperature of the battery packs 100 can be easily monitored by using the temperature terminals 108 of the battery packs 100. The controller 74 of the electric circuit 56 can selectively switch the three switch circuits 80*a*, 80*b*, 80*c* of the supply circuit 72, based upon the temperature data received from the battery packs 100. Alternatively, the switch circuits 80*a*, 80*b*, 80*c* may be switched by the user.

Figure 13:
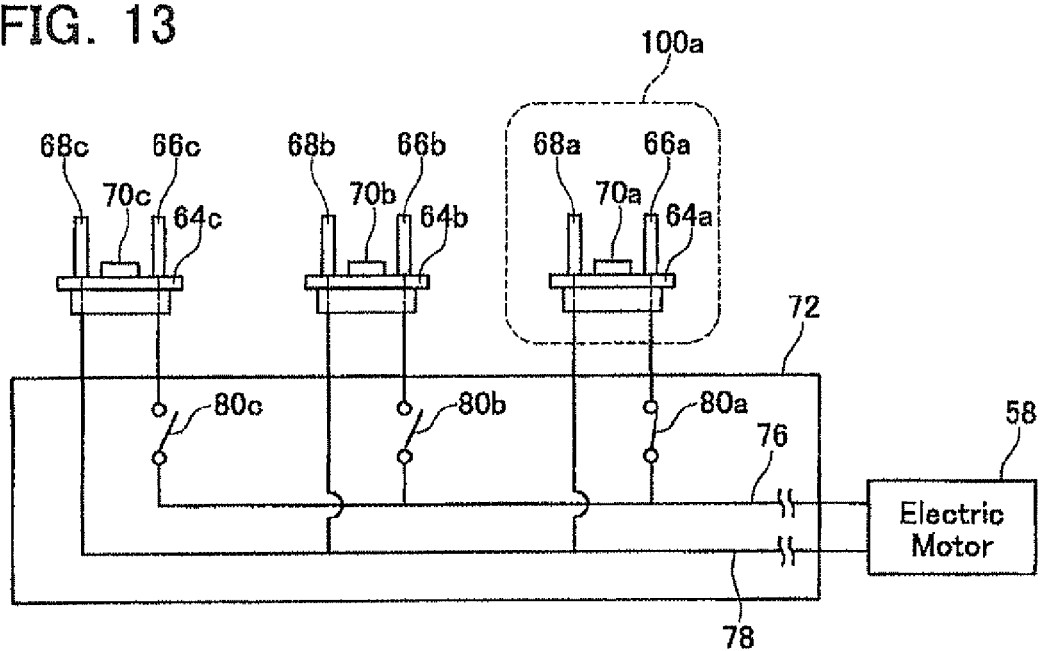
FIG. 13 shows a situation in which only one battery pack is used in Embodiment 2.

As shown in FIG. 13, only one battery pack 100*a* can be attached and used with the electric bicycle 10 of Embodiment 2. It is not necessary for the three battery packs 100*a*, 100*b*, 100*c* to be attached. Even when only one battery pack 100*a* is attached, electric power will be supplied from that battery pack 100*a* to the electric motor 58, and assistance will be provided by the torque output from the electric motor 58. Thus, the user can change the number of battery packs 100 attached to the electric bicycle 10 in response to the time and distance the user intends to travel by the electric bicycle 10. By installing only the number of battery packs 100 that is needed, a needless increase in the weight of the electric bicycle 10 can be avoided.

Figure 14:
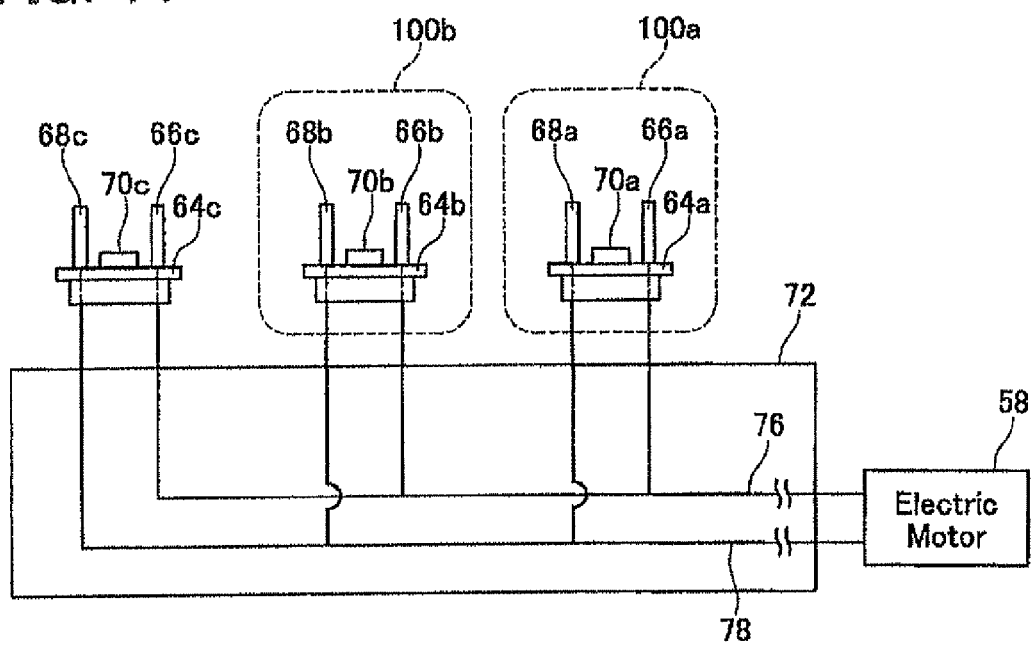
FIG. 14 shows a modification of the supply circuit of Embodiment 2, in which a switch circuit has been removed.

FIG. 14 is a modification of the supply circuit 72 described in Embodiment 2. As shown in FIG. 14, the switch circuits 80*a*, 80*b*, 80*c* do not necessarily need to be provided in the supply circuit 72. Even if the switch circuits 80*a*, 80*b*, 80*c* are not provided, the attached battery packs 100*a*, 100*b* will be connected in parallel to the motor 58. The user can change the number of battery packs 100*a*, 100*b*, 100*c* attached to the electric bicycle 10 in response to the time and distance the user intends to travel by the electric bicycle 10.

(Embodiment 3)

An electric bicycle of Embodiment 3 will be described. The electric bicycle of Embodiment 3 is the electric bicycle 10 of Embodiment 2, in which primarily the supply circuit 72 has been changed. Because the configuration of the other aspects of the electric bicycle of Embodiment 2 have not been particularly changed, duplicate description will be omitted by applying the same reference numbers.

Figure 15:
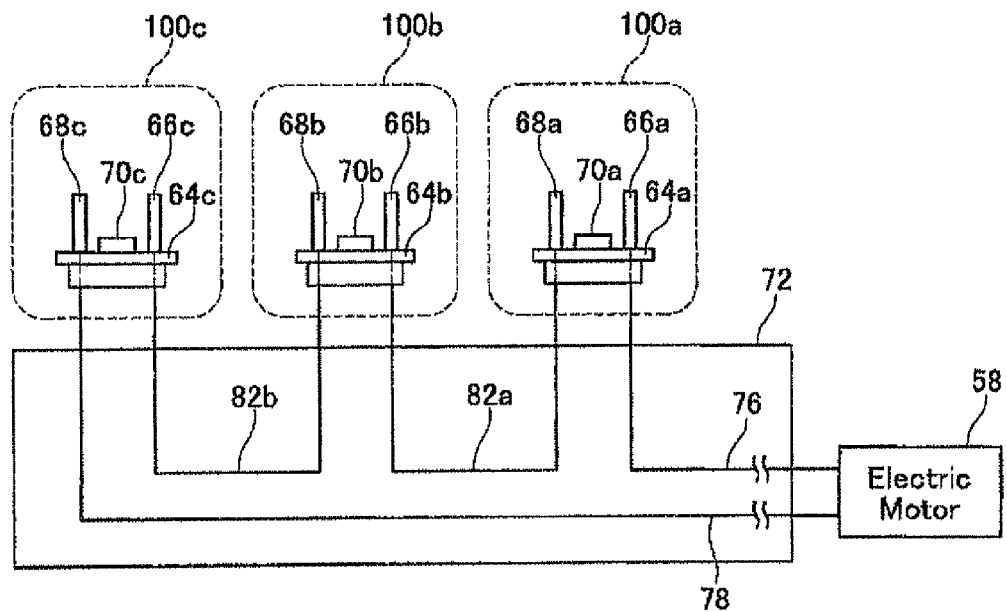
FIG. 15 shows a supply circuit of Embodiment 3, in which a plurality of battery packs is connected in series.

As shown in FIG. 15, the supply circuit 72 of Embodiment 3 can connect the three attached battery packs 100*a*, 100*b*, 100*c* in series with the electric motor 58. In other words, with the supply circuit 72 of Embodiment 3, the negative terminal connection terminal 68*a* of the first connection plug 64*a* is connected to the positive terminal connection terminal 66*b* of the second connection plug 64*b* via a first connection line 82*a*, and the negative terminal connection terminal 68*b* of the second connection plug 64*b* is connected to the positive terminal connection terminal 66*c* of the third connection plug 64*c* via a second connection line 82*b*.

With the electric bicycle 10 of Embodiment 3, a high voltage can be applied to the electric motor 58 by three battery packs 100 connected in series. A large current can flow to the electric motor 58, and the torque output by the electric motor 58 can be improved. According to the electric bicycle 10 of Embodiment 3, the user can receive a larger auxiliary force from the electric motor 58, and can easily climb even steep inclines.

Figure 16:
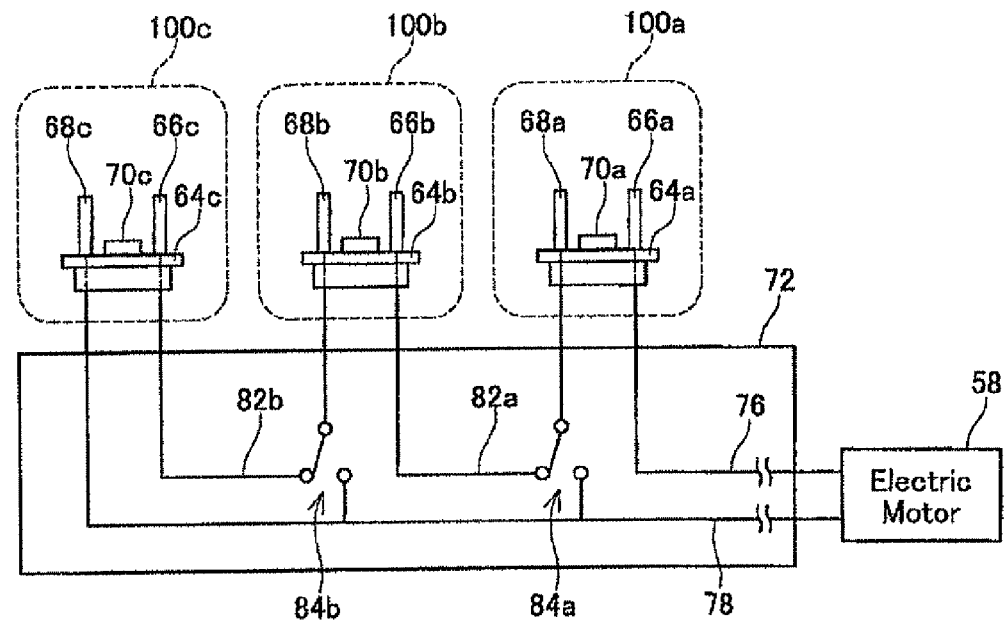
FIG. 16 shows a modification of the supply circuit of Embodiment 3, in which a selection circuit has been added.

FIG. 16 is a modification of the supply circuit 72 described in Embodiment 3. Two selection circuits 84*a*, 84*b* are added to the supply circuit 72 shown in FIG. 16. The two selection circuits 84*a*, 84*b* are each operated by a command from the controller 74. The first selection circuit 84*a* is provided between the first connection line 82 and the negative electric power line 78. The first selection circuit 84*a* is a circuit that selectively connects the negative terminal connection terminal 68*a* of the first connection plug 64*a* to either the positive terminal connection terminal 66*b* of the second connection plug 64*b* or the negative electric power line 78. The second selection circuit 84*b* is provided between the second connection line 82*b* and the negative electric power line 78. The second selection circuit 84*b* is a circuit that selectively connects the negative terminal connection terminal 68*b* of the second connection plug 64*b* to either the positive terminal connection terminal 66*c* of the third connection plug 64*c* or the negative electric power line 78. Each selection circuit 84*a*, 84*b* may e.g. be configured by a plurality of semiconductor switches.

Figure 17:
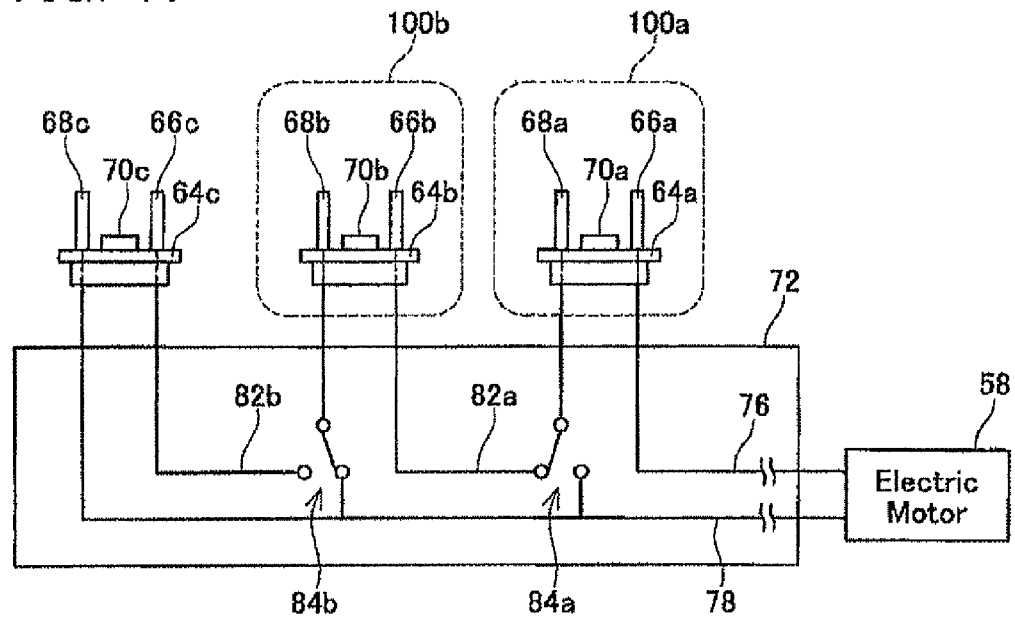
FIG. 17 shows a situation in which only two battery packs are used in the modified supply circuit shown in FIG. 16.
Figure 18:
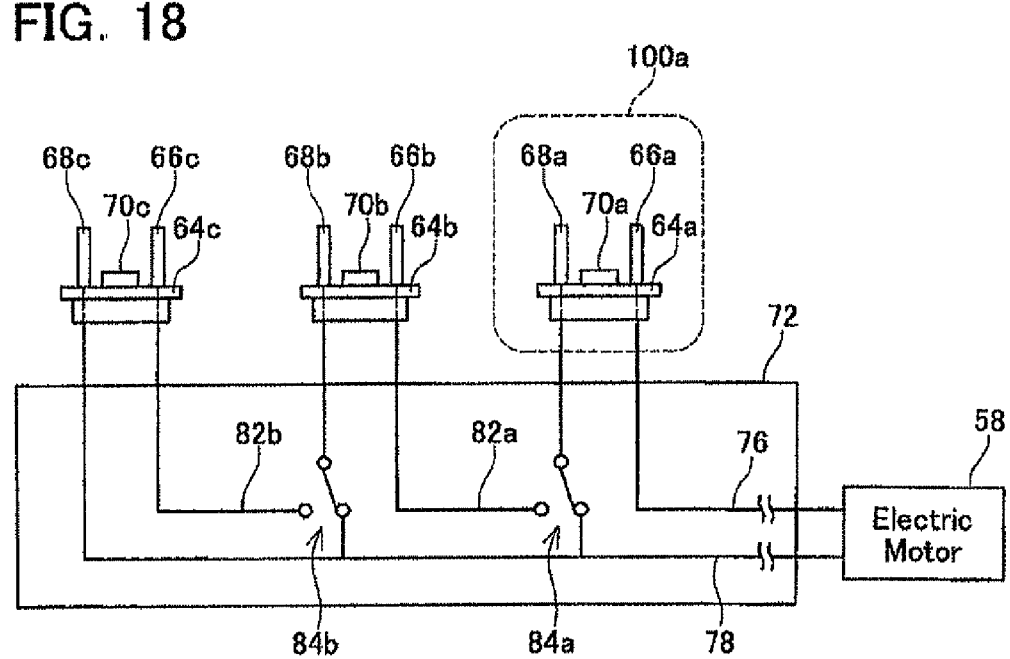
FIG. 18 shows a situation in which only one battery pack is used in the modified supply circuit shown in FIG. 16.

As shown in FIG. 16, the supply circuit 72 having the selection circuits 84*a*, 84*b* can connect the three battery packs 100*a*, 100*b*, 100*c* to the electric motor 58 in series when the three battery packs 100*a*, 100*b*, 100*c* are attached. In addition, as shown in FIG. 17, when two battery packs 100*a*, 100*b* have been attached, the supply circuit 72 can connect the two battery packs 100*a*, 100*b* to the electric motor 58 in series by switching the second selection circuit 84*b*. Then, as shown in FIG. 18, when only one battery pack 100*a* is attached, the supply circuit 72 can correctly connect the one attached battery pack 100*a* to the electric motor 58 by further switching the first selection circuit 84*a*. The user can change the number of battery packs 100*a*, 100*b*, 100*c* attached to the electric bicycle 10 in response to the auxiliary force requested by the electric motor 58. The switching of the aforementioned selection circuit 84*a*, 84*b* is performed by a command from the controller 74. The controller 74 will detect the number of battery packs 100 attached to the battery interface 54 by monitoring the voltages generated by the connection plugs 64*a*, 64*b*, 64*c*. Then, the controller 74 will operate each selection circuit 84*a*, 84*b* based upon the number of battery packs 100 detected. Note that the selection circuits 84*a*, 84*b* may also be configured such that the user can operate them by an operation panel (not illustrated in the drawings).

The teachings disclosed in the aforementioned embodiments are not limited to the electric bicycle, and can also be applied to a variety of other electric wheeled apparatuses. Without being limited to the specific type of electric wheeled apparatus, an electric wheeled apparatus that can use the battery packs from electric power tools can more effectively utilize the battery packs, and can reduce the burden on the user managing the battery packs. In particular, an electric motorcycle capable of running only on torque from the electric motor can employ much of the teachings disclosed in the present embodiment, because many portions thereof resemble the structure and function of an electric bicycle.

In addition, although a combination of the electric hammer drill and the electric bicycle was described in the aforementioned embodiment, the teachings of the present embodiment can effectively employ a combination of other types of electric power tools and other types of electric wheeled apparatuses. For example, it is effective to employ the teachings of the present embodiment in a combination of an electric golf cart (a type of electric wheeled apparatus) and an electric garden tool. In other words, if the battery pack for the electric power tool can be used in the electric golf cart, the battery pack for the electric power tool can be effectively utilized. The battery pack can be used in the electric golf cart during golf course business hours, and the battery pack can be used in the electric garden tool outside the golf course business hours to manage the grass and trees thereon.

In addition, the teachings described in Embodiments 2 and 3 that use a plurality of battery packs are not limited to the use of battery packs for electric power tools, and the use of other battery packs is also effective. In other words, even with an electric wheeled apparatus that uses a dedicated battery pack, the teachings described in Embodiments 2 and 3 can be usefully employed.

In addition, by combining the teachings of Embodiments 2 and 3, it will also be possible to implement an electric circuit unit that can selectively form a circuit that connects the plurality of attached battery packs in parallel, and a circuit that connects the plurality of attached battery packs in series. Alternatively, it will also be possible to implement an electric circuit unit that will divide the plurality of attached battery packs into a plurality of groups, connect the battery packs in each group in parallel, and then connect the group of battery packs connected in parallel in series.

(Embodiment 4)

Figure 19:
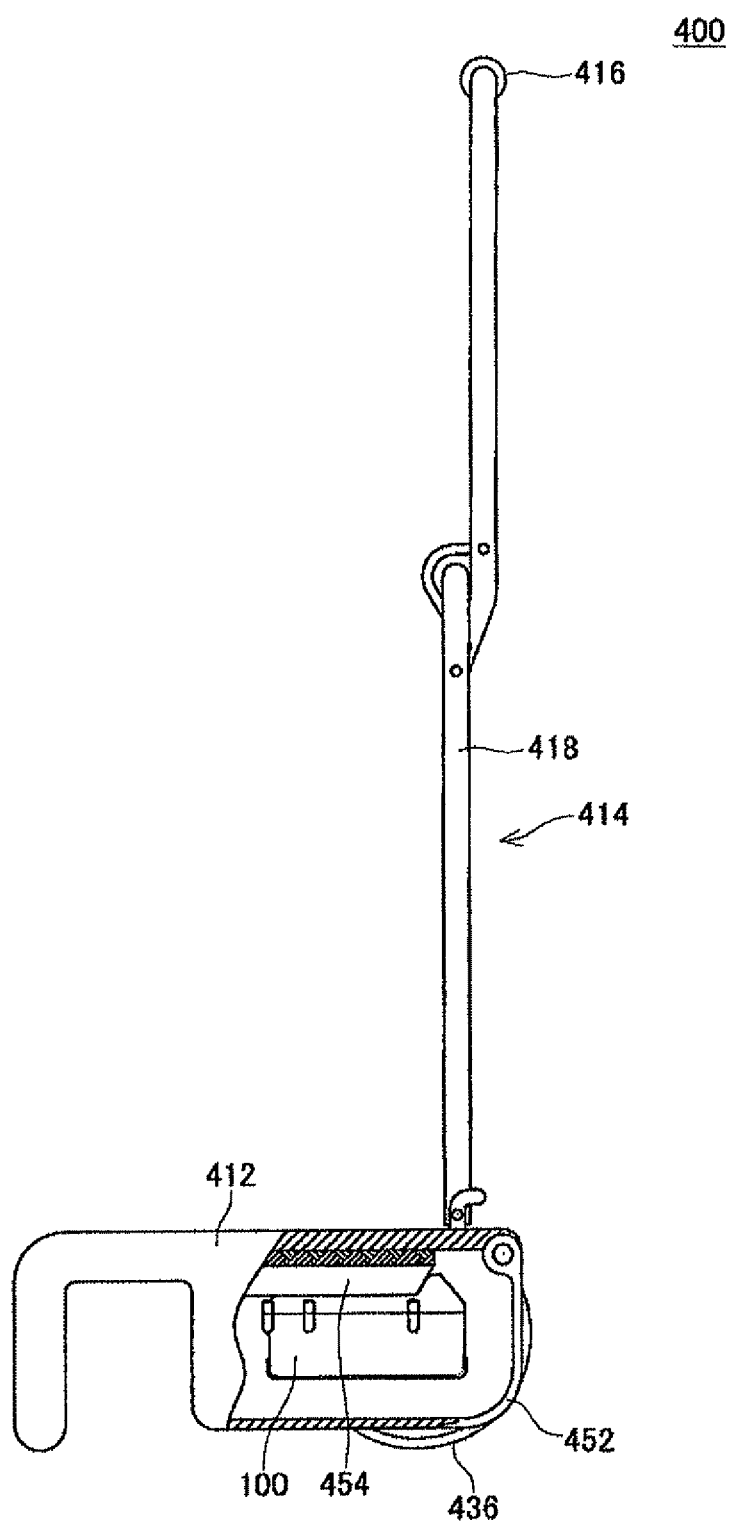
FIG. 19 is a side view that schematically shows a carrier cart of Embodiment 4.
Figure 20:
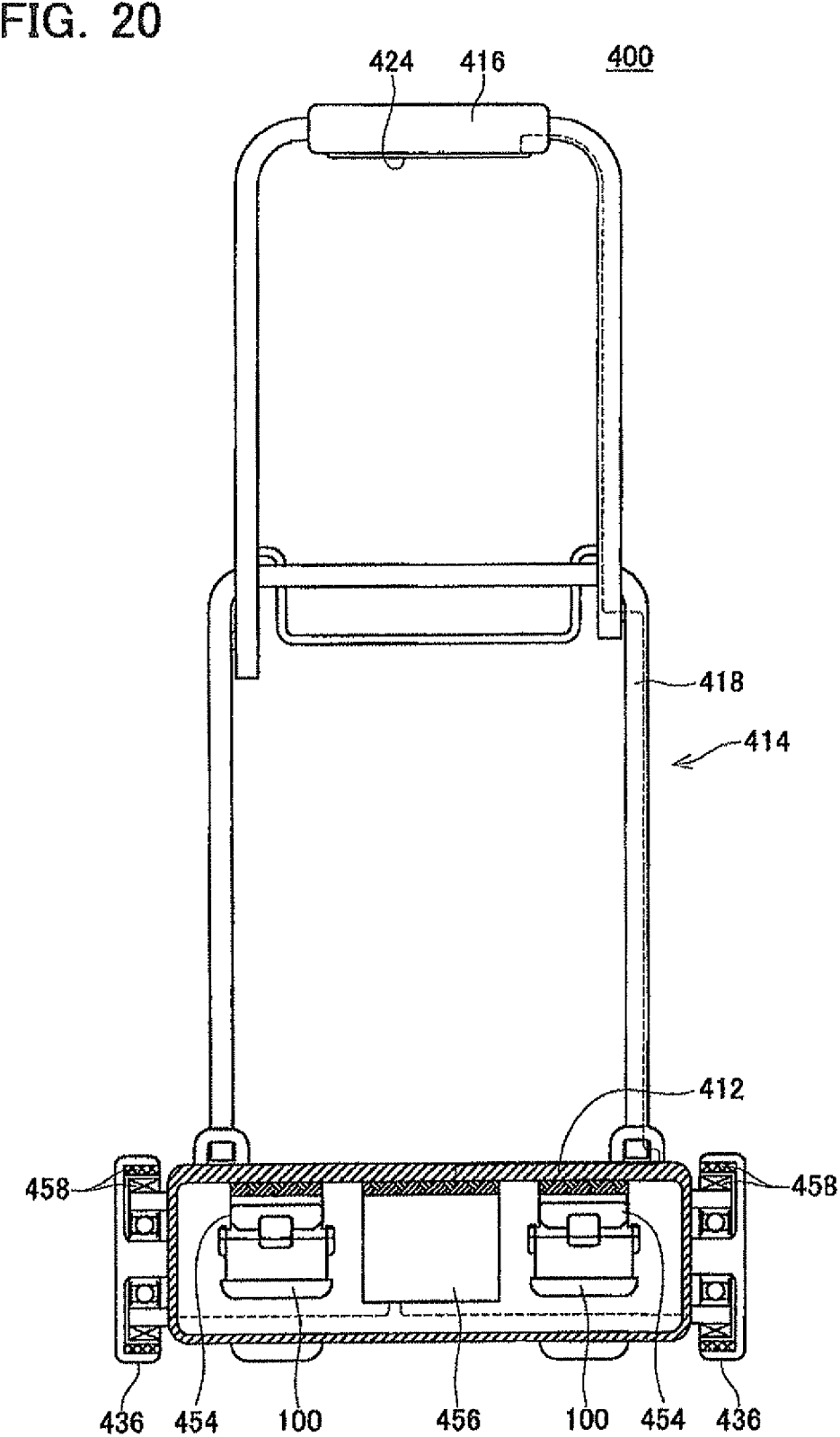
FIG. 20 is a rear view that schematically shows the carrier cart of Embodiment 4.

An electric carrier cart 400 of Embodiment 4 will be described with reference to FIGS. 19 and 20. The electric carrier cart 400 is one type of electric carrier that is used to haul objects. As shown in FIGS. 19 and 20, the electric carrier cart 400 has a cart main body 414 and a pair of wheels 436 that are rotatably provided on the cart main body 414.

The cart main body 414 has a luggage platform 412 on which luggage is loaded, and a rear frame 418 that extends upward from the luggage platform 412. A grip 416 for the user to grasp is provided on the upper end of the rear frame 418. A grip sensor 424 for detecting whether or not the user is grasping the grip 416 is provided on the grip 416. A pair of wheels 436 is provided on the luggage platfotiii 412 of the cart main body 414. The pair of wheels 436 is arranged concentrically, with the luggage platform 412 interposed therebetween. When the user grasps the grip 416 and tilts the cart main body 414 toward the rear frame 418, the electric carrier cart 400 will be supported by only the pair of wheels 436. When the user pulls (or pushes) the carrier cart 400 in this state, the electric carrier cart 400 will move by rotating the pair of wheels 436.

The carrier cart 400 further comprises two battery interfaces 454, an electric circuit unit 456 that is connected to the two battery interfaces 454, and a pair of electric motors 458 that are connected to the electric circuit unit 456. Here, each battery interface 454 is substantially the same as the battery interface 54 shown in FIG. 6, and removably receive battery packs 100 for the electric power tool 200. The battery interfaces 435 and the electric circuit unit 456 are housed in the luggage platform 412, and an openable cover 452 for attaching and removing the battery packs 100 is provided on the luggage platform 412.

The battery interfaces 454 are arranged such that the attached battery packs 100 are located between the pair of wheels 436. According to this type of arrangement, the center of gravity of the battery packs 100 will not greatly shift even when the cart main body 414 is tilted around the pair of wheels 436. Thus, the user cannot particularly feel the weight of the battery packs 100, and can pull (or push) the electric carrier cart 400 when in the tilted state. Here, it is not necessary to position all of the attached battery packs 100 in between the pair of wheels 436, but it is preferable that the center of gravity of the battery packs 100 is located in between the pair of wheels 436.

The pair of electric motors 458 is each integrated with a corresponding one of the pair of wheels 436. In other words, each electric motor 458 is referred to as an in-wheel type of electric motor. When in-wheel type electric motors 458 are employed, the electric carrier cart 400 can be pulled (or pushed) in the tilted state without the user particularly feeling the weight of the electric motors 458. Electric power is supplied from the battery packs 100 attached to the battery interfaces 454 to each electric motor 458 via the electric circuit unit 456. Each electric motor 458 applies torque to the integrated wheels 436, and assists the user to pull (or push) the carrier cart 400. Here, the aforementioned grip sensor 424 is connected to the electric circuit unit 456, and the electric circuit unit 456 will supply electric power to each electric motor 458 only while the user is grasping the grip 416. Thus, movement of the electric carrier cart 400 that is not intended by the user will be prohibited. In addition, the electric circuit unit 456 preferably adjusts the electric power supplied to each electric motor 458 in response to the force applied by the user on the grip 416.

The electric carrier cart 400 do not need dedicated battery packs, and can use the battery packs 100 of the electric power tool 200 as a power source. Because of that, the user can effectively use the electric battery packs 100 in his or her possession in both the electric power tool 200 and the electric carrier cart 400. Because the battery packs 100 designed for use in the electric power tool 200 have a high output, they can sufficiently function as a power source for the electric carrier cart 400.

(Embodiment 5)

Figure 21:
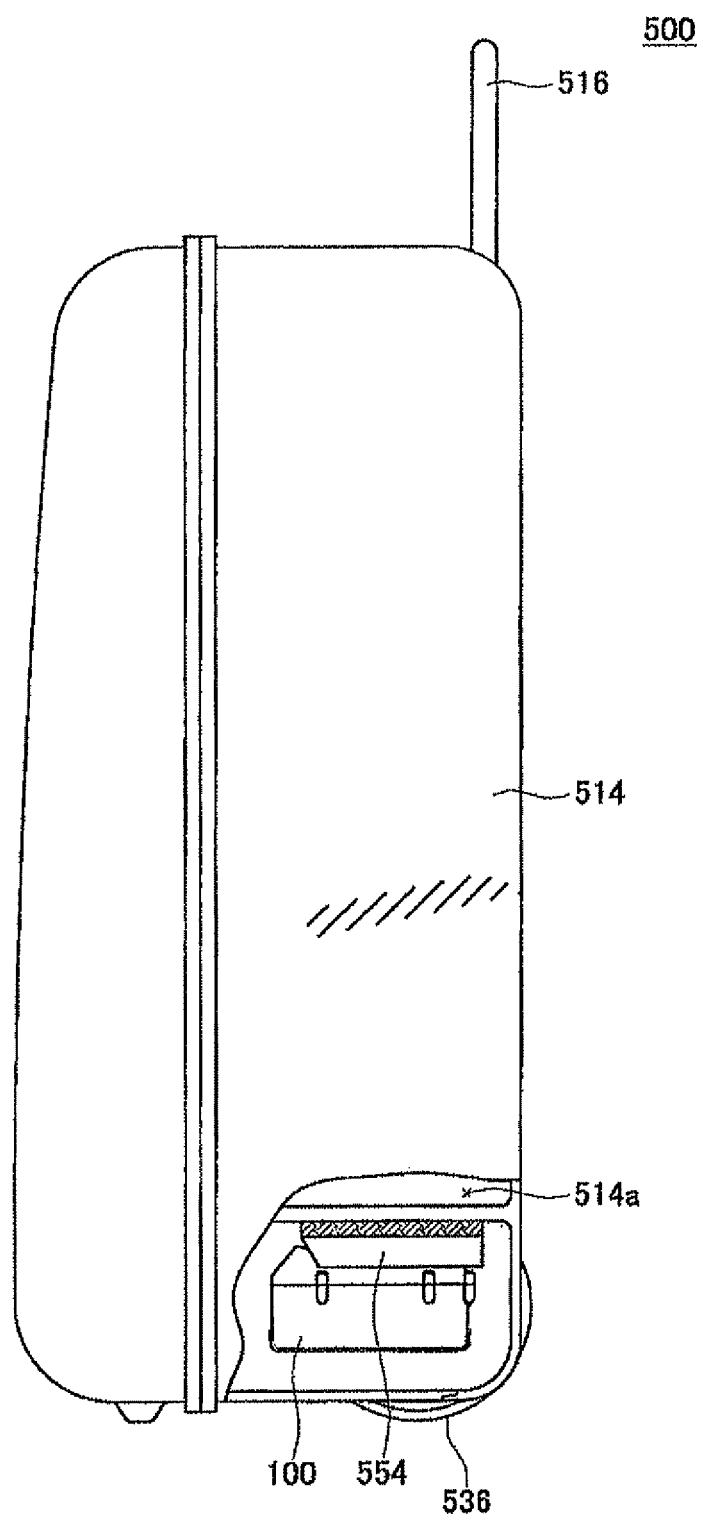
FIG. 21 is a side view that schematically shows a suitcase of Embodiment 5.
Figure 22:
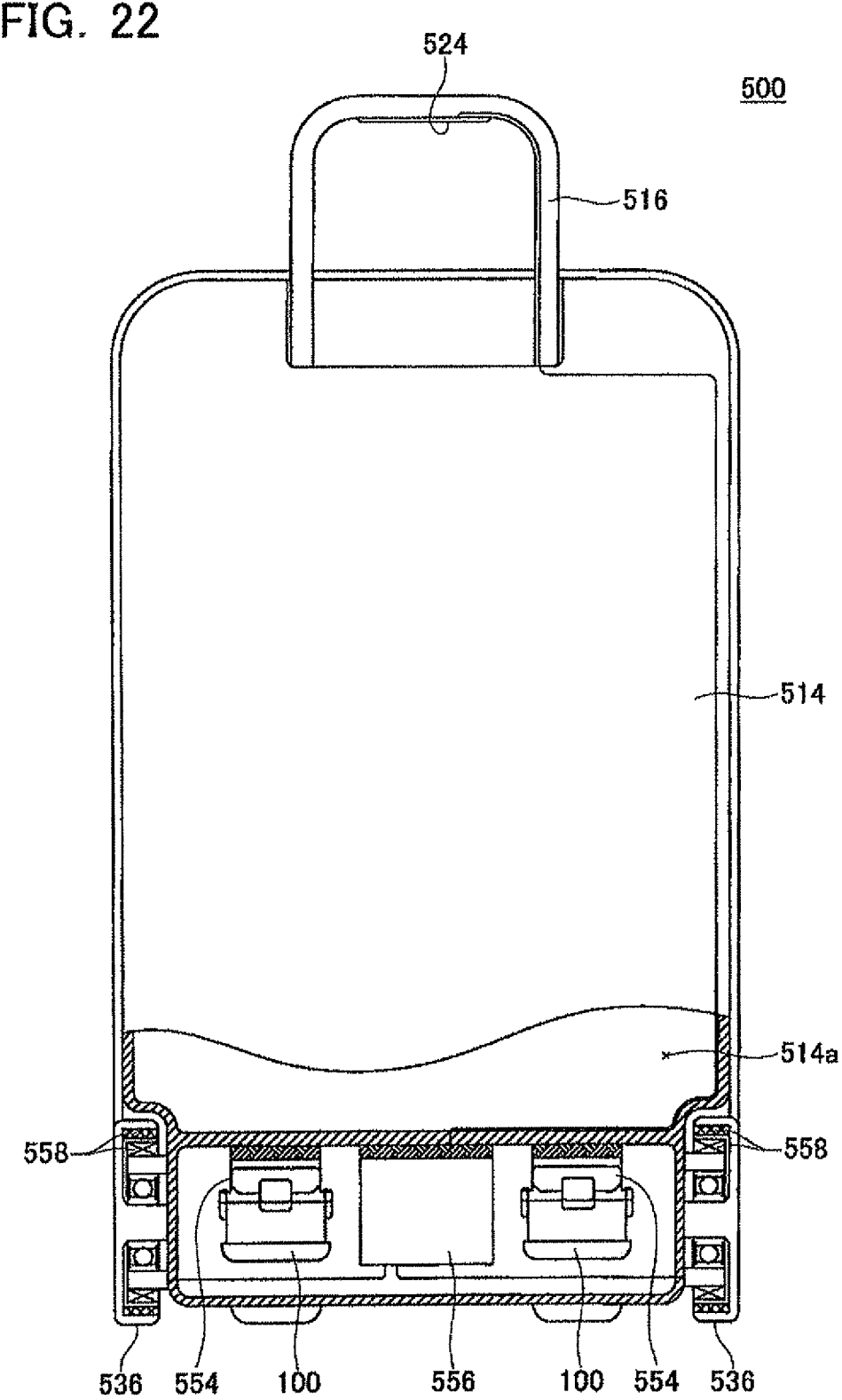
FIG. 22 is a rear view that schematically shows the suitcase of Embodiment 5.

An electric suitcase 500 of Embodiment 5 will be described with reference to FIGS. 21 and 22. The electric suitcase 500 is one type of electric carrier that is used to haul objects. As shown in FIGS. 21 and 22, the electric suitcase 500 has a case main body 514 and a pair of wheels 536 that is rotatably provided on the case main body 514.

The case main body 514 has a housing 514 that houses objects, and a grip 516 that is arranged on the upper portion thereof. A grip sensor 524 for detecting whether or not the user is grasping the grip 516 is provided on the grip 516. A pair of wheels 536 is provided on the lower portion of the case main body 514. The pair of wheels 536 is arranged concentrically, with the case main body 514 interposed therebetween. When the user grasps the grip 516 and tilts the case main body 514 toward the grip 518, the electric suitcase 500 will be supported by only the pair of wheels 536. When the user pulls (or pushes) the electric suitcase 500 in this state, the electric suitcase 500 will move by rotating the pair of wheels 436.

The electric suitcase 500 further comprises two battery interfaces 554, an electric circuit unit 556 that is connected to the two battery interfaces 554, and a pair of electric motors 558 that is connected to the electric circuit unit 556. Each battery interface 554 is substantially the same as the battery interface 54 shown in FIG. 6, and removably receive battery packs 100 for the electric power tool 200. The battery interfaces 554 and the electric circuit unit 556 are housed in the case main body 514. The attachment and removal of the battery packs 100 with respect to the battery interfaces 554 is only possible from inside the case main body 514, and the case main body 514 must be open. Thus, the battery pack 100 can be prevented from being unintentionally lost, without for example locking the case main body 514.

The battery interfaces 554 are arranged such that the attached battery packs 100 are located between the pair of wheels 436. According to this type of arrangement, the center of gravity of the battery packs 100 will not greatly shift even when the case main body 514 tilts around the pair of wheels 536. Thus, the user cannot particularly feel the weight of the battery packs 100, and can pull (or push) the electric suitcase 500 when in the tilted state. Here, all attached battery packs 100 are positioned between the pair of wheels 536. Preferably, the center of gravity of the battery packs 100 is positioned between the pair of wheels 536.

The pair of electric motors 558 is each integrated with a corresponding one of the pair of wheels 536. In other words, each electric motor 558 is referred to as an in-wheel type of electric motor. When in-wheel type electric motors 558 are employed, the electric suitcase 500 can be pulled (or pushed) in the tilted state without the user particularly feeling the weight of the electric motors 558. Electric power is supplied from the battery packs 100 attached to the battery interfaces 558 to each electric motor 556 via the electric circuit unit 554. Each electric motor 558 applies torque to the integrated wheels 536, and assists the user to pull (or push) the electric suitcase 500. Here, the aforementioned grip sensor 524 is connected to the electric circuit unit 556, and the electric circuit unit 556 will supply electric power to each electric motor 558 only while the user is grasping the grip 516. Thus, movement of the electric suitcase 500 that is not intended by the user will be prohibited. Here, the electric circuit unit 556 preferably adjusts the electric power supplied to each electric motor 558 in response to the force applied by the user on the grip 516.

The electric suitcase 500 does not need dedicated battery packs, and can use the battery packs 100 of the electric power tool 200 as a power source. Because of that, the user can effectively use the electric battery packs 100 in his or her possession in both the electric power tool 200 and the electric suitcase 500. Because the battery packs 100 designed for use in the electric power tool 200 have a high output, they can sufficiently function as a power source for the electric suitcase 500. In addition, because the battery packs 100 designed for use in the electric power tool 200 have superior shock resistance, those functions can be maintained without being damaged even if, for example, the electric suitcase 500 receives a shock on a conveyor or turntable at the airport.

(Embodiment 6)

Figure 23:
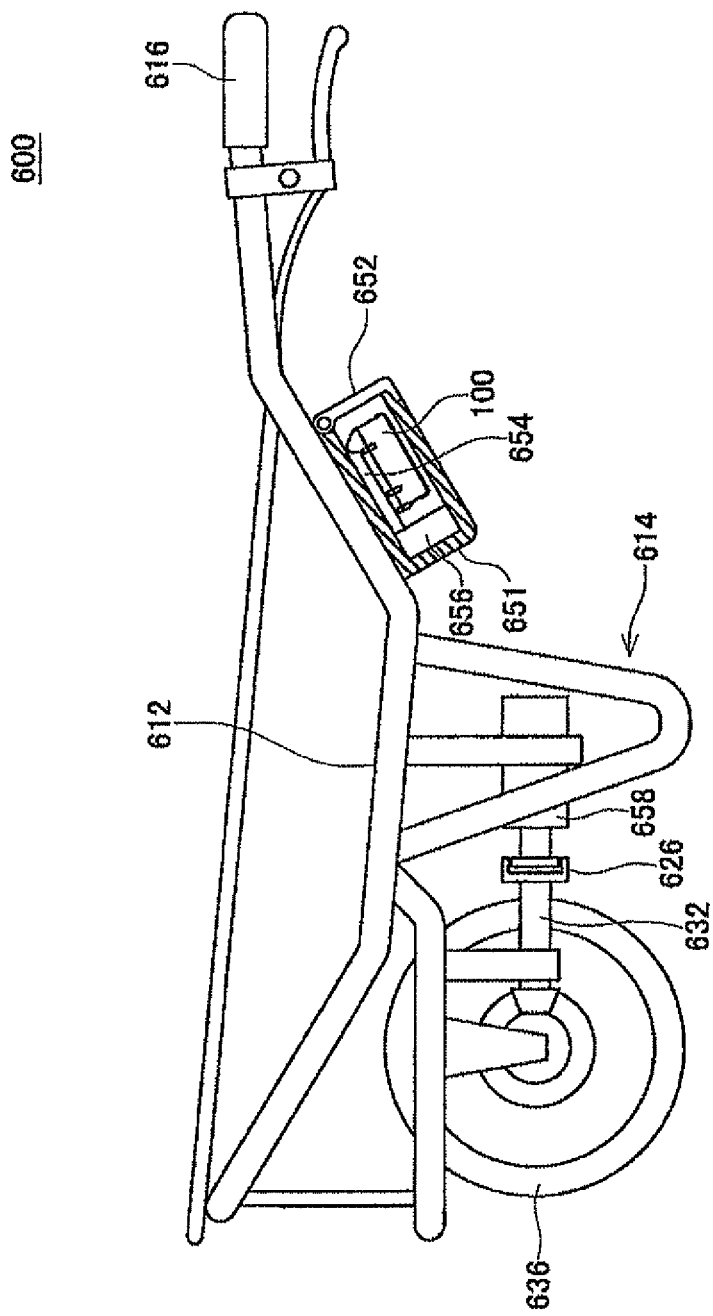

A wheelbarrow 600 of Embodiment 6 will be described with reference to FIG. 23. The wheelbarrow 600 is one type of electric carrier that is used to transport objects, and is one example of an electric wheeled apparatus realized by the present teachings. The wheelbarrow 600 is also referred to as a wheelbarrow, a construction wheelbarrow, or a cat car. As shown in FIG. 23, the wheelbarrow 600 has a main body 614, and one wheel 636 rotatably provided on the main body 614.

The main body 614 has a load portion 612 in which dirt, sand, etc. is loaded, and a pair of grips 616 that are arranged on the rear portion thereof (the right side in FIG. 23). Grip sensors (not illustrated in the drawings) for detecting whether or not the user is grasping the grips 616 are provided on the grips 616. The wheel 636 is arranged on the front portion of the main body 614 (the left side in FIG. 23). When the user grasps and raises the grips 616, the wheelbarrow 600 will be supported only by the wheel 536. When the user pushes the wheelbarrow 600 in this state, the wheelbarrow 600 will move by rotating the wheel 636.

The wheelbarrow 600 further comprises a battery interface 654, an electric circuit unit 656 that is connected to the battery interface 654, and an electric motor 658 that is connected to the electric circuit unit 656. The battery interface 654 is substantially the same as the battery interface 54 shown in FIG. 6, and removably receives a battery pack 100 that is used in the electric power tool 200. The battery interfaces 654 and the electric circuit unit 656 are housed in an enclosed case 651 having an openable cover 652.

The electric motor 658 is connected to the wheel 636 via a drive shaft 632 having a clutch 626. Electric power is supplied from the battery pack 100 attached to the battery interface 654 to the electric motor 658 via the electric circuit unit 656. The electric motor 658 will apply torque to the wheel 636 and assist the user pushing the wheelbarrow 600. Here, the aforementioned grip sensors are connected to the electric circuit unit 656, and the electric circuit unit 656 will supply electric power to the electric motor 658 only while the user is grasping the grips 616. Thus, movement of the electric wheelbarrow 600 that is not intended by the user will be prohibited. Here, the electric circuit unit 656 preferably adjusts the electric power supplied to the electric motor 658 in response to the force applied by the user on the grips 616.

The electric wheelbarrow 600 does not need a dedicated battery pack, and can use the battery pack 100 of the electric power tool 200 as a power source. Because of that, the user can effectively use the electric battery packs 100 in his or her possession in both the electric power tool 200 and the wheelbarrow 600. Because the battery packs 100 designed for use in the electric power tool 200 have a high output, they can sufficiently function as a power source for the wheelbarrow 600.

FIG. 24 shows a modified wheelbarrow 602. As shown in FIG. 24, an in-wheel type electric motor 658 is employed in the wheelbarrow 602, and the electric motor 658 is integrated with the wheel 636. When an in-wheel type electric motor 658 is employed, the wheelbarrow 600 can be pushed in a state in which the grips 616 are raised without the user particularly feeling the weight of the electric motor 658.

(Embodiment 7)

An electric power mower 700 of Embodiment 7 will be described with reference to FIG. 25. The electric power mower 700 is one type of an electric work vehicle that is used to cut grass, and is one example of the electric wheeled apparatus realized by the present teachings. As shown in FIG. 25, the electric power mower 700 has a vehicle body 714, a pair of drive wheels 736 rotatably provided on the vehicle body 714, and a pair of driven wheels 737 rotatably provided on the vehicle body 714.

A rotatably supported cutter 722 and a handle 718 are provided on the vehicle body 714. The cutter 722 is provided on the bottom surface of the vehicle body 714, and cuts grass by rotating. A grip 716 for the user to grasp is provided on the handle 718. A grip sensor 724 for detecting whether or not the user is grasping the grip 716 is provided on the grip 716. The user will grasp the grip 716 and push the electric power mower 700, and grass will be cut by moving the electric power mower 700 over the grass.

The electric power mower 700 further comprises a battery interface 754, an electric circuit unit 756 that is connected to the battery interface 754, and an electric motor 758 that is connected to the electric circuit unit 756. The battery interface 654 is substantially the same as the battery interface 54 shown in FIG. 6, and removably receives a battery pack 100 that is used in the electric power tool 200. The battery interface 754, the electric circuit unit 756, and the electric motor 758 are housed in the vehicle body 714.

The electric motor 758 is connected to both the drive wheels 736 and the cutter 722 via transmission belts 732a, 732b. Electric power is supplied from the battery pack 100 attached to the battery interface 758 to the electric motor 756 via the electric circuit unit 754. In other words, the electric motor 758 applies torque to the cutter 722 and the drive wheels 736, and both rotates the cutter 722 and assist the user to push the electric power mower 700. Here, the aforementioned grip sensor 724 is connected to the electric circuit unit 756, and the electric circuit unit 756 will supply electric power to the electric motor 758 only while the user is grasping the grip 716. Thus, movement of the electric power mower 700 that is not intended by the user will be prohibited. Here, the electric circuit unit 756 preferably adjusts the electric power supplied to the electric motor 758 in response to the force applied by the user on the grip 716.

The electric power mower 700 does not need a dedicated battery pack, and can use the battery packs 100 used with the electric power tool 200 as a power source. Because of that, the user can effectively use the electric battery packs 100 in his or her possession in both the electric power tool 200 and the electric power mower 700. Because the battery packs 100 designed for use in the electric power tool 200 have a high output, they can sufficiently function as a power source for the electric power mower 700.

(Embodiment 8)

An electric power cultivator 800 of Embodiment 8 will be described with reference to FIG. 26. The electric power cultivator 800 is one type of electric work vehicle that is used to cultivate soil, and is one example of an electric wheeled apparatus realized by the present teachings. Note that the electric power cultivator 800 is also referred to as a management device. As shown in FIG. 26, the electric power cultivator 800 has a vehicle body 814, and a pair of wheels 852 rotatably provided on the vehicle body 814.

A rotatably supported cultivating rotor 822, and handles 818 are provided on the vehicle body 814. The cultivating rotor 822 is provided on the front portion of the vehicle body 814 (the left side in FIG. 26), and cultivates soil by rotating. The handles 818 extend rearward of the vehicle body (the right side in FIG. 26), and grips 816 for the user to grasp are provided on the ends thereof. Grip sensors (not illustrated in the drawings) for detecting whether or not the user is grasping the grips 816 are provided on the grips 816. The user will grasp the grips 816 and push the electric power cultivator 800, and cultivation will be performed by running the electric power cultivator 800.

The electric power cultivator 800 further comprises a battery interface 854, an electric circuit unit 856 that is connected to the battery interface 854, and an electric motor 858 that is connected to the electric circuit unit 856. The battery interface 654 is substantially the same as the battery interface 54 shown in FIG. 6, and removably receives the battery pack 100 that is used in the electric power tool 200. The battery interface 854, the electric circuit unit 856, and the electric motor 858 are housed in the vehicle body 814. An openable cover 852 for attaching and removing the battery pack 100 is provided on the vehicle body 814.

The electric motor 858 is connected to both the wheels 836 and the cultivating rotor 822 via transmission belts 832a, 832b. Electric power is supplied from the battery pack 100 attached to the battery interface 858 to the electric motor 856 via the electric circuit unit 854. In this configuration, the electric motor 858 applies torque to the cutter 822 and the wheels 836, and both rotates the cultivating rotor 822 and assists the user to push the electric power cultivator 800. Here, the aforementioned grip sensors are connected to the electric circuit unit 856, and the electric circuit unit 856 will supply electric power to the electric motor 858 only while the user is grasping the grips 816. Thus, movement of the electric power cultivator 800 that is not intended by the user will be prohibited. Here, the electric circuit unit 856 preferably adjusts the electric power supplied to the electric motor 858 in response to the force applied by the user on the grips 816.

The electric power cultivator 800 does not need a dedicated battery pack, and can use the battery packs 100 used with the electric power tool 200 as a power source. Because of that, the user can effectively use the electric battery packs 100 in his or her possession in both the electric power tool 200 and the electric power cultivator 800. Because the battery packs 100 designed for use in the electric power tool 200 have a high output, they can sufficiently function as a power source for the electric power cultivator 800.

As described in the embodiments above, the battery pack 100 for use in the electric power tool 200 can be effectively used as a power source for driving the wheels on various electric wheeled apparatuses. In other words, as shown in FIG. 27, the battery pack 100 designed for various electric power tools 200 is not only a power source for driving the tool of these electric power tools 200, but also sufficiently functions as a power source for driving the wheels on the various electric wheeled apparatuses 10, 400, 500, 600, 700, 800.

In addition, the battery packs for use in electric power tools have a high output voltage and a large charge capacity, and also have superior shock resistance and dust resistance. In addition, the battery packs can be equipped with a sensor that detects the temperature of the secondary battery cells, a sensor that detects the voltages of the secondary battery cells, a controller, and memory, and can deliver and receive this information to and from the equipment in which it is attached. Because battery packs for use in electric power tools are equipped with a large number of useful characteristics, the battery packs are not limited to electric wheeled apparatuses, and can be effectively utilized in other types of devices and equipment. Specifically, the battery packs can be effectively used in electric power cultivators (also referred to as management devices), air compressors, water pumps, portable lighting, back-up power supply for computers, and energy storage units for solar battery systems and cogeneration systems, etc.

What is claimed is:

1. An electric wheeled apparatus comprising:
   a main body;
   at least one wheel supported by the main body in a rotatable manner;
   an electric motor configured to apply torque to the at least one wheel;
   a battery interface configured to removably receive at least first battery pack and a second battery pack which are each originally designed as a power source of an electric power tool, wherein the battery interface is configured to receive the first and second battery packs while the first and second battery packs are detached from the power tool; and an electric circuit unit configured to electrically connect the first and second battery packs attached to the battery interface with the electric motor, wherein the battery interface comprises a first positive connection terminal, a first negative connection terminal, a second positive connection terminal and a second negative connection terminal, the first positive connection terminal and the first negative connection terminal are configured to be electrically connected with a positive terminal and a negative terminal of the first battery pack respectively when the first battery pack is attached to the battery interface, the second positive connection terminal and the second negative connection terminal and configured to be electrically connected with a positive terminal and a negative terminal of the second battery pack respectively when the second battery pack is attached to the battery interface, and the electric unit is configured to selectively be switched to form a series connection circuit in which the first positive connection terminal is electrically connected with the second negative connection terminal with the electric motor being electrically interposed in the connection circuit between the first positive connection terminal and the second negative connection terminal, and in which the first negative connection terminal is electrically connected with the second positive connection terminal without the electric motor being electrically interposed in the connection circuit between the first negative connection terminal and the second positive connection terminal, and the electric circuit unit is further configured to selectively be switched to form any one of the series connection circuit and a parallel connection circuit in which the first positive connection terminal is electrically connected with the second positive connection terminal without the electric motor being electrically interposed in the connection circuit between the first positive connection terminal and the second positive connection terminal, and in which the first negative connection terminal is electrically connected with the second negative connection terminal without the electric motor being electrically interposed in the connection circuit between the first negative connection terminal and the second negative connection terminal.

2. The electric wheeled apparatus as in claim 1, wherein the electric wheeled apparatus is an electric bicycle, which further comprises:

pedals configured to be pedaled by a user on the electric bicycle; and a user force transmission configured to mechanically connect the pedals with the at least one wheel so as to transmit force applied to the pedals by the user to the at least one wheel.

3. The electric wheeled apparatus as in claim 2, wherein the electric circuit unit is configured to control electric power supply from the first and second battery packs to the electric motor in accordance with the force applied to the pedals by the user.

4. The electric wheeled apparatus as in claim 1, wherein the electric wheeled apparatus is a carrier cart, the main body has a platform configured to support baggage, the at least one wheel includes a pair of wheels; and the battery interface is arranged such that the first and second battery packs are partly located between the pair of wheels when the first and second battery packs are attached to the battery interface.

5. The electric wheeled apparatus as in claim 4, wherein the electric circuit unit is configured to control electric power supply to the electric motor in accordance with a force applied to the carrier cart by a user.

6. The electric wheeled apparatus as in claim 1, wherein the electric apparatus is a wheelbarrow, the at least one wheel is a single wheel and the electric motor is an in-wheel incorporated in the single wheel.

7. The electric wheeled apparatus as in claim 6, wherein the electric circuit unit is configured to control electric power supply to the electric motor in accordance with a force applied to the wheelbarrow by a user.

8. The electric wheeled apparatus as in claim 1, wherein the electric wheeled apparatus is a suitcase, the main body is an openable case that supports the at least one wheel driven by the electric motor, and the battery interface is arranged within the openable case such that the first and second battery packs are able to be attached to and detached from the battery interface from inside the openable case.

9. The electric wheeled apparatus as in claim 8, wherein the electric circuit unit is configured to control electric power supply to the electric motor in accordance with a force applied to the suitcase by a user.

10. The electric wheeled apparatus as in claim 1, wherein the electric wheeled apparatus is an electric power mower having a cutter, and the electric motor is configured to apply torque to both of the at least one wheel and the cutter.

11. The electric wheeled apparatus as in claim 10, wherein the electric circuit unit is configured to control electric power supply to the electric motor in accordance with a force applied to the electric power mower by a user.

12. The electric wheeled apparatus as in any claim 1, wherein the electric wheeled apparatus is an electric power cultivator having a cultivating rotor, and the electric motor is configured to apply torque to both of the at least one wheel and the cultivating rotor.

13. The electric wheeled apparatus as in claim 12, wherein the electric circuit unit is configured to control electric power supply to the electric motor in accordance with a force applied to the electric power cultivator by a user.

14. A combination comprising:

an electric power tool;

at least a first battery pack and a second battery pack each configured to be detachably attached to the electric power tool;

a charger configured to electrically connect to and recharge the first and second battery packs; and the electric wheeled apparatus as in claim 1, the battery interface of which is configured to removably receive the first and second battery packs while the first and second battery packs are detached from the electric power tool.

15. The electric wheeled apparatus as in claim 1, wherein the electric circuit unit comprises a first selection switch configured to selectively electrically connect the first negative connection terminal with any one of the second positive connection terminal and the second negative connection terminal, without the electric motor being electrically interposed in the connection circuit between the first negative connection terminal and the any one of the second positive connection terminal and the second negative connection terminal.

16. The electric wheeled apparatus as in claim 1, wherein the battery interface is configured to removably receive a third battery pack which is originally designed as a power source of the electric power tool, wherein the battery interface is configured to receive the third battery pack while the third battery pack is detached from the power tool, the battery interface further comprises a third positive connection terminal and a third negative connection terminal which are configured to be electrically connected with a positive terminal and a negative terminal of the third battery pack respectively when the third battery pack is attached to the battery interface, and when the electric circuit unit forms the series connection circuit, the third positive connection terminal is electrically connected with the second negative connection terminal without the electric motor being electrically interposed in the connection circuit between the third positive connection terminal and the second negative connection terminal, and the third negative connection terminal is electrically connected with the first positive connection terminal with the electric motor being electrically interposed in the connection circuit between the third negative connection terminal and the first positive connection terminal.

17. The electric wheeled apparatus as in claim 16, wherein the electric circuit unit is further configured to selectively be switched to form any one of the series connection circuit and the parallel connection circuit in which the first positive connection terminal is electrically connected with both the second and third positive connection terminals without the electric motor being electrically interposed in the connection circuit between the first positive connection terminal and either of the second and third positive connection terminals, and the first negative connection terminal is electrically connected with both the second and third negative connection terminals without the electric motor being electrically interposed in the connection circuit between the first negative connection terminal and either of the second and third positive negative connection terminals.

18. The electric wheeled apparatus as in claim 1, wherein the electric circuit unit comprises a first selection switch and a second selection switch, the first selection switch is configured to selectively electrically connect the first negative connection terminal, with any one of the second positive connection terminal and the third negative connection terminal, without the electric motor being electrically interposed in the connection circuit between the first negative connection terminal and the any one of the second positive connection terminal and the third negative connection terminal, and the second selection switch is configured to selectively electrically connect the second negative connection terminal, with any one of the third positive connection terminal and the third negative connection terminal, without the electric motor being electrically interposed in the connection circuit between the second negative connection terminal and the any one of the third positive connection terminal and the third negative connection terminal.

* * * * *